(12) United States Patent
Liu et al.

(10) Patent No.: US 12,166,700 B2
(45) Date of Patent: *Dec. 10, 2024

(54) SYSTEM AND METHOD FOR TRANSMITTING A SIGNAL

(71) Applicant: ZTE CORPORATION, Guangdong (CN)

(72) Inventors: Kun Liu, Guangdong (CN); Bo Dai, Guangdong (CN); Xianming Chen, Guangdong (CN); Weiwei Yang, Guangdong (CN); Huiying Fang, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/743,300

(22) Filed: May 12, 2022

(65) Prior Publication Data

US 2022/0271881 A1    Aug. 25, 2022

Related U.S. Application Data

(63) Continuation of application No. 16/739,020, filed on Jan. 9, 2020, now Pat. No. 11,356,215, which is a
(Continued)

(51) Int. Cl.
*H04L 5/00* (2006.01)
*H04B 1/7143* (2011.01)
(Continued)

(52) U.S. Cl.
CPC ......... *H04L 5/0012* (2013.01); *H04B 1/7143* (2013.01); *H04L 5/0053* (2013.01);
(Continued)

(58) Field of Classification Search
CPC ... H04L 5/0012; H04L 5/0091; H04L 5/0053; H04W 72/0453; H04W 74/0833; H04B 17/143

See application file for complete search history.

(56) References Cited

U.S. PATENT DOCUMENTS 7,016,649 B1 * 3/2006 Narasimhan ........... H01Q 25/00
                                                              455/562.1
9,661,663 B1 * 5/2017 Lin ....................... H04W 48/12
(Continued)

FOREIGN PATENT DOCUMENTS

| WO | WO-2017119943 A1 * | 7/2017 | ............. H04B 1/713 |
| WO | WO-2017131577 A1 * | 8/2017 | ............. H04B 1/713 |
| WO | WO-2018128579 A1 * | 7/2018 | ........... H04B 1/7143 |

OTHER PUBLICATIONS

Huawei et al. "On support of larger cell radius for NPRACH", R1-1707025, 3GPP TSG RAN WG1 Meeting #89, Hangzhou, China, May 14, 2017, 5 pages.
(Continued)

*Primary Examiner* — Redentor Pasia
(74) *Attorney, Agent, or Firm* — Duane Morris LLP

(57) ABSTRACT

A system and method for allocating network resources are disclosed herein. In one embodiment, the system and method are configured to perform: receiving a resource allocation message indicative of a plurality of resource groups allocated for a signal; and transmitting the signal using a portion of the plurality of resource groups, wherein, in a frequency domain, the portion of the plurality of resource groups presents a hopping pattern comprising at least a first hopping path that is associated with a first plurality of increasing frequency spacings and a second hopping path that is associated with a second plurality of decreasing frequency spacings.

15 Claims, 17 Drawing Sheets

Related U.S. Application Data continuation of application No. PCT/CN2017/092813, filed on Jul. 13, 2017.

(51) Int. Cl.
*H04W 72/0453* (2023.01)
*H04W 74/0833* (2024.01)

(52) U.S. Cl.
CPC ....... *H04L 5/0091* (2013.01); *H04W 72/0453* (2013.01); *H04W 74/0833* (2013.01)

(56) References Cited

U.S. PATENT DOCUMENTS

| | | | |
|---|---|---|---|
| 10,506,605 B2* | 12/2019 | Lee | H04W 72/51 |
| 10,904,923 B2* | 1/2021 | Lin | H04L 27/2614 |
| 11,116,005 B2* | 9/2021 | Shin | H04L 5/1469 |
| 11,356,215 B2* | 6/2022 | Liu | H04W 72/0453 |
| 11,382,078 B2* | 7/2022 | Chen | H04W 72/0453 |
| 11,497,051 B2* | 11/2022 | Lin | H04W 74/004 |
| 2004/0233889 A1 | 11/2004 | Fujita et al. | |
| 2007/0264939 A1 | 11/2007 | Sugar | |
| 2009/0154625 A1 | 6/2009 | Kwak et al. | |
| 2009/0279588 A1 | 11/2009 | Mochizuki | |
| 2010/0110994 A1 | 5/2010 | Ratsuk et al. | |
| 2011/0211652 A1 | 9/2011 | Debbah et al. | |
| 2013/0230032 A1 | 9/2013 | Lu et al. | |
| 2016/0295584 A1* | 10/2016 | Chen | H04W 72/0446 |
| 2017/0202028 A1* | 7/2017 | Gaal | H04B 1/7143 |
| 2017/0223743 A1 | 8/2017 | Lin et al. | |
| 2017/0332404 A1 | 11/2017 | Wang et al. | |
| 2018/0020441 A1 | 1/2018 | Lo | |
| 2018/0035421 A1* | 2/2018 | Lin | H04W 48/12 |
| 2018/0295648 A1* | 10/2018 | Chen | H04W 74/08 |
| 2019/0007152 A1 | 1/2019 | Yi et al. | |
| 2019/0037607 A1 | 1/2019 | Ahn et al. | |
| 2019/0089563 A1 | 3/2019 | Parkvall et al. | |
| 2019/0159230 A1 | 5/2019 | Kim et al. | |
| 2019/0215110 A1* | 7/2019 | Yang | H04L 5/0053 |
| 2019/0280734 A1 | 9/2019 | Park et al. | |
| 2019/0349985 A1 | 11/2019 | Lin et al. | |
| 2020/0068619 A1* | 2/2020 | Kim | H04W 74/004 |
| 2020/0178296 A1* | 6/2020 | Shin | H04L 27/2607 |
| 2020/0213173 A1* | 7/2020 | Sun | H04W 72/1263 |
| 2020/0314908 A1* | 10/2020 | Hwang | H04W 74/0833 |

OTHER PUBLICATIONS

Huawei et al. "NB-PRACH design", R1-160025, 3GPP TSG RAN WG1 NB-IoT Ad-Hoc meeting, Budapest, Hungary, Jan. 17, 2016, 7 pages.

3rd Generation Partnership Project; Technical Specification Group Radio Access Network; Evolved Universal Terrestrial Radio Access (E-UTRA); Physical channels and modulation (Release 14), 3GPP TS 36.211, V14.3.0 (Jun. 2017), Section10.1.6.1, pp. 155-193.

* cited by examiner

302

304

SYSTEM AND METHOD FOR TRANSMITTING A SIGNAL

CROSS-REFERENCE TO RELATED APPLICATIONS

The present application is a continuation of U.S. application Ser. No. 16/739,020, filed on Jan. 9, 2020, which claims priority to PCT international application PCT/CN2017/092813, entitled "SYSTEM AND METHOD FOR TRANSMITTING A SIGNAL," filed on Jul. 13, 2017, each of which is expressly incorporated by reference herein in its entirety.

TECHNICAL FIELD

The disclosure relates generally to wireless communications and, more particularly, to systems and methods for allocating resource to transmit a signal.

BACKGROUND

In accordance with rapid developments and increasing needs of the Internet of Things (IoT), a new radio interface, a Narrowband Internet of Things (NB-IoT), has been proposed by the $3^{rd}$ Generation Partnership Project (3GPP). The NB-IoT is aimed to enhance existing Global System for Mobile Communications (GSM) and Long-Term Evolution (LTE) networks to better serve IoT uses or applications. Improved indoor coverage, support for massive number of low throughput end devices, low delay sensitivity, ultra-low device cost, coverage extension, battery lifetime extension, and backward compatibility are some exemplary objectives of the NB-IoT.

Generally, in a wireless communication system adopting the NB-IoT (hereinafter "NB-IoT system"), a user equipment device (UE) sends at least one preamble signal (hereinafter "Preamble'), typically via a Physical Random Access Channel (PRACH), to a base station (BS) to initiate a contention-based random access procedure. Such a Preamble is used as a temporary identity of the UE for the BS to estimate various information, e.g., timing advance command, scheduling of uplink resources for the UE to use in subsequent steps, such that the UE may use the above-mentioned information to finish the random access procedure.

An existing format of the Preamble includes a first set of four symbol groups (SGs) that are adjacent to one another in a time domain and subjected to only one frequency hopping over more than two subcarrier indexes in a frequency domain. The Preamble is sent using the first set of the four SGs, and when the Preamble is desired to be sent again or another Preamble is desired to be sent, a second set of four SGs, limited by the same criteria as described above, is used. Moreover, in the existing format of the Preamble, the first and second sets of SGs, for example, are randomly chosen from a pre-defined pattern, wherein the pattern is formed by a plurality of SGs that are confined within 12 subcarriers in the frequency domain.

However, it has been noted that the use of the existing format of the Preamble may encounter a variety of issues such as, for example, wrong estimation of the timing advance command when a respective coverage of the BS extends beyond 100 kilometers (typically known as a "cell"), strong interference among plural neighboring cells, etc. Accordingly, the existing format of the Preamble in the NB-IoT system is not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: receiving a resource allocation message indicative of a plurality of resource groups allocated for a signal; and transmitting the signal using a portion of the plurality of resource groups, wherein, in a frequency domain, the portion of the plurality of resource groups presents a hopping pattern comprising at least a first hopping path that is associated with a first plurality of increasing frequency spacings and a second hopping path that is associated with a second plurality of decreasing frequency spacings.

In a further embodiment, a method includes: transmitting a resource allocation message indicating a plurality of resource groups allocated for a signal, wherein, in a frequency domain, at least a portion of the plurality of resource groups presents a hopping pattern comprising at least a first hopping path that is associated with a first plurality of increasing frequency spacings and a second hopping path that is associated with a second plurality of decreasing frequency spacings.

In another embodiment, a communication node includes: a receiver configured to receive a resource allocation message indicative of a plurality of resource groups allocated for a signal; and a transmitter configured to transmit the signal using a portion of the plurality of resource groups. In a frequency domain, the portion of the plurality of resource groups presents a hopping pattern comprising at least a first hopping path that is associated with a first plurality of increasing frequency spacings and a second hopping path that is associated with a second plurality of decreasing frequency spacings.

In yet another embodiment, a communication node, includes: a transmitter configured to transmit a resource allocation message indicating a plurality of resource groups allocated for a signal. In a frequency domain, at least a portion of the plurality of resource groups presents a hopping pattern comprising at least a first hopping path that is associated with a first plurality of increasing frequency spacings and a second hopping path that is associated with a second plurality of decreasing frequency spacings.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
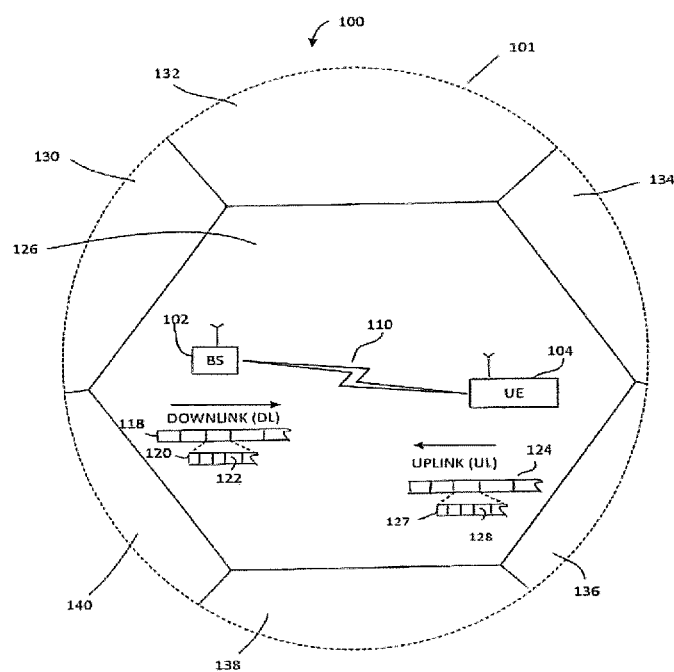
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. In the following discussion, the wireless communication network 100 may be a NB-IoT network, which is herein referred to as "network 100." Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
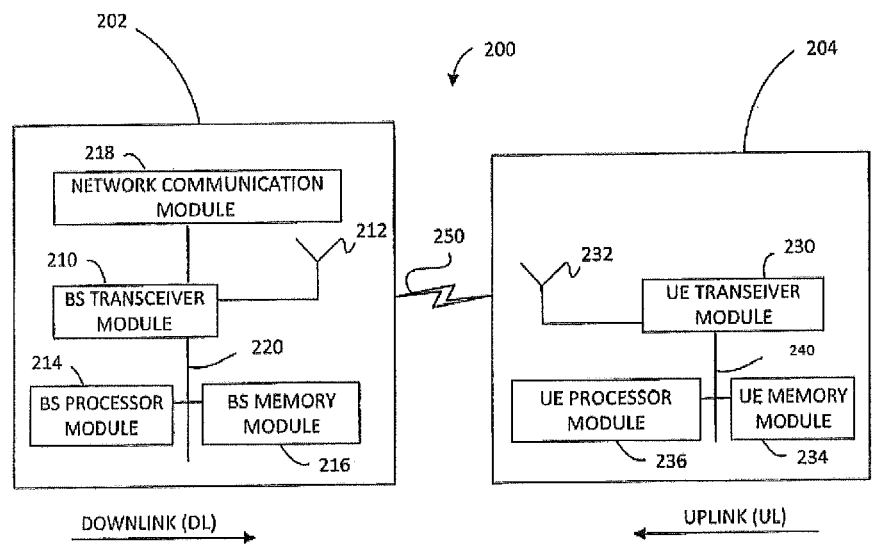
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

Referring again to FIG. 1, as discussed above, to initiate a random access procedure, the UE 104 sends a Preamble using a plurality of resource groups (e.g., SGs (symbol groups)) to the BS 102. The present disclosure provides various embodiments of a format of such a Preamble, hereinafter the "Preamble format," for the UE 104 to use. In some embodiments, the disclosed Preamble format includes a plurality of SG patterns, each of which is subjected to a respective frequency/time hopping rule. In some embodiments, such frequency/time hopping rule may be pre-defined in a protocol of the network 100 or transmitted in a higher-level signal (e.g., a radio resource control (RRC) signal) from the BS 102 to the UE 104. Compared to the existing Preamble format, the respective frequency/time hopping rules advantageously allows the BS 102 to estimate the timing advanced command more accurately for the UE 104 (i.e., more accurate scheduling), for example, when the cell 126 is implanted as a cell that has a coverage greater than 100 kilometers (kin), which will be discussed below. Moreover, when using the frequency/time hopping rules to send a Preamble, interference between the cell 126 and one or more other neighboring cells (e.g., 130, 132, 136, etc.) may be substantially mitigated, which can in turn reduce a False Alarm Probability (FAP) happening to the Preamble.

Figure 3A:
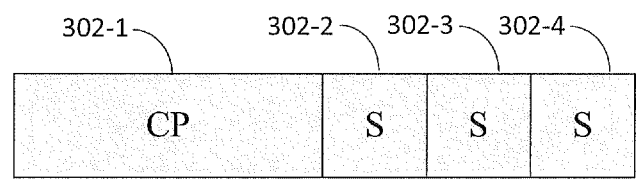
FIG. 3A illustrates an exemplary frame structure of a symbol group, in accordance with some embodiments of the present disclosure.
Figure 3B:
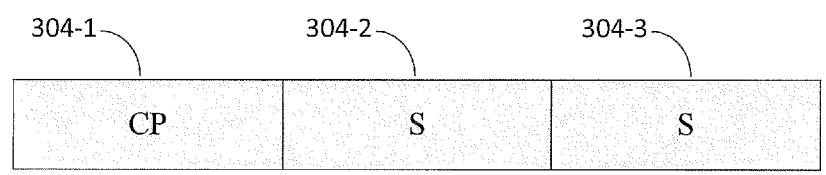
FIG. 3B illustrates another exemplary frame structure of a symbol group, in accordance with some embodiments of the present disclosure.

FIGS. 3A and 3B provide two exemplary frame structures of the SG 302 and 304, respectively, that can be used by the disclosed Preamble format, in accordance with some embodiments of the present disclosure. Referring first to FIG. 3A, the SG 302 includes a cyclic prefix (CP) 302-1, and three symbols (Ss) 302-2, 302-3, and 302-4. More specifically, each of the symbols in the SG 302 extends across a time duration of about 266.7 microseconds (µs) and the CP 302-1 extends across 3 of such a time duration of the symbol (i.e., 3×266.7 µs) along the time domain, and is modulated on a 3.75 kHz tone along the frequency domain, e.g., a 3.75 kHz frequency spacing, which is typically known as a 3.75 kHz subcarrier spacing. For purpose of consistency, the SG 302 is herein referred to as being defined on a 3.75 kHz subcarrier spacing. As such, the SG 302 may extend across about 1.6 milliseconds (ms) in the time domain and spaced from another SG by 3.75 kHz in the frequency domain.

Referring then to FIG. 3B, the SG 304 includes one CP 304-1, and two symbols 304-2 and 304-3. More specifically, each of the CP and symbols in the SG 304 extends across a time duration of about 800 µs along the time domain, and is modulated on a 1.25 kHz tone along the frequency domain, e.g., a 1.25 kHz subcarrier spacing, which is typically known as a 1.25 kHz subcarrier spacing. For purpose of consistency, the SG 304 is herein referred to as being defined on a 1.25 kHz subcarrier spacing. As such, the SG 304 may extend across about 2.4 milliseconds (ms) in the time domain and spaced from another SG by 1.25 kHz in the frequency domain. It is noted that the frame structures of the SG 302 and 304, of FIGS. 3A and 3B, are merely provided for illustration purposes. Accordingly, any of a variety of other frame structures of the SG can be used in the following discussions of the disclosed Preamble format while remaining within the scope of the present disclosure. For example, the SG frame structure may have any desired length (e.g., time duration) of CP(s) and any desired number of symbol(s), respectively, and/or be modulated on any desired frequency of tone (i.e., having any desired frequency/subcarrier spacing).

Figure 4A:
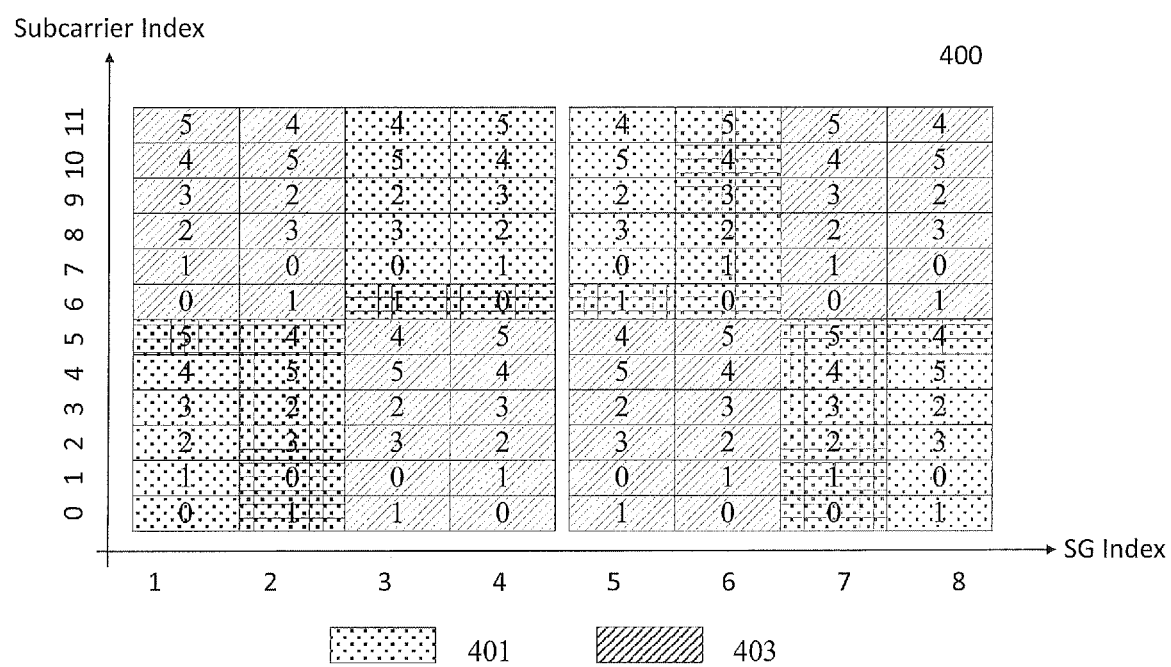
FIG. 4A illustrates an exemplary symbol group map, in accordance with some embodiments of the present disclosure.
Figure 4B:
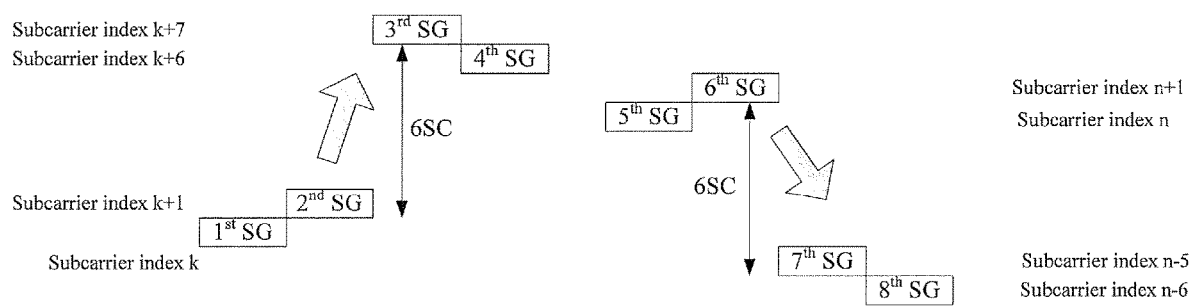
FIGS. 4B and 4C respectively illustrate exemplary formats of a preamble signal when the symbol group map of FIG. 4A is used, in accordance with some embodiments of the present disclosure.
Figure 4C:
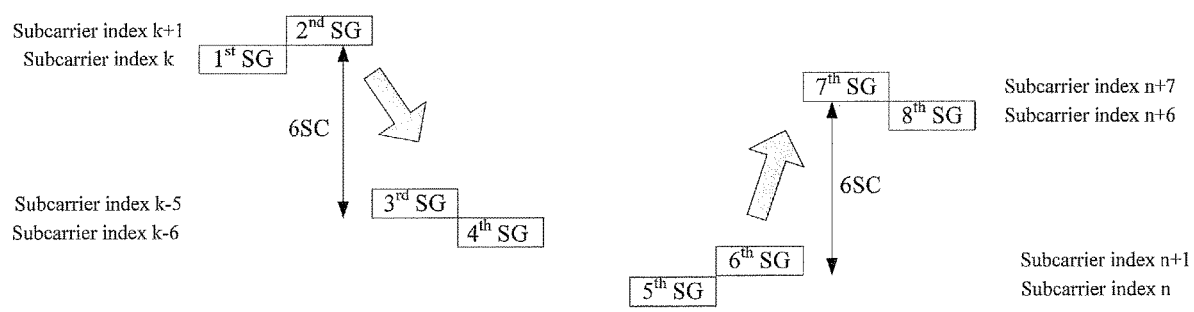

In an embodiment, when an SG is defined based on the subcarrier spacing of 3.75 kHz (e.g., the SG 302), a disclosed Preamble format, which will be discussed with respect to FIGS. 4B and 4C, is decided based on a predefined SG map 400 as illustrated in FIG. 4A. In the illustrated embodiment of FIG. 4A, the SG map 400 includes 96 SGs, each of which may be implemented by the SG 302. More specifically, in some embodiments, the SG map 400 extends across 8 SGs with corresponding time durations (12.8 ms) in the time domain, and across 12 SGs, i.e., 12 contiguous subcarrier spacings, in the frequency domain (180 kHz), respectively. In the time domain, each SG is associated with a respective SG index (e.g., SG index 1, 2, 3, 4, 5, 6, 7, or 8); and in the frequency domain, each SG is associated with a respective frequency index, for example, a respective subcarrier index (e.g., subcarrier index 0, 1, 2, 3, 4, 5, 6, 7, 8, 9, 10, or 11). In some embodiments, the first 4 SGs (i.e., the SGs with SG indexes 1-4) and last 4 SGs (i.e., the SGs with SG indexes 5-8) of the SG map 400 may be spaced from each other by a pre-defined time interval.

According to some embodiments, the SG map 400 are divided into two sub-groups 401 and 403, which are filled with a dotted pattern and a diagonal stripes pattern, respectively, as shown in FIG. 4A. In some embodiments, in the SG map 400, the SGs sharing a common SG index (i.e., along a same column of the SG map 400) has a half that belongs to the sub-group 401 and the other half that belongs to the sub-group 403. Further, along one of the columns of the SG map 400, each of the SGs, belonging to the sub-group 401, is associated with a respective PRACH (Physical Random Access Channel) index that is selected from one of 0, 1, 2, 3, 4, and 5; and each of the SGs, belonging to the sub-group 403, is associated with a respective PRACH index that is selected from one of 0, 1, 2, 3, 4, and 5. In some embodiments, respective distributions of the PRACH indexes in terms of SG index/subcarrier index within each sub-group are pre-defined, as provided below.

For example, along the column with the SG index 1, the SGs within the sub-group 401 with the subcarrier indexes 0, 1, 2, 3, 4, and 5 are associated with respective PRACH indexes 0, 1, 2, 3, 4, and 5, respectively; and the SGs within the sub-group 403 with the subcarrier indexes 6, 7, 8, 9, 10, and 11 are associated with respective PRACH indexes 0, 1, 2, 3, 4, and 5, respectively. Along the column with the SG index 2, the SGs within the sub-group 401 with the subcarrier indexes 0, 1, 2, 3, 4, and 5 are associated with respective PRACH indexes 1, 0, 3, 2, 5, and 4, respectively; and the SGs within the sub-group 403 with the subcarrier indexes 6, 7, 8, 9, 10, and 11 are associated with respective PRACH indexes 1, 0, 3, 2, 5, and 4, respectively. Along the column with the SG index 3, the SGs within the sub-group 403 with the subcarrier indexes 0, 1, 2, 3, 4, and 5 are associated with respective PRACH indexes 1, 0, 3, 2, 5, and 4, respectively; and the SGs within the sub-group 401 with the subcarrier indexes 6, 7, 8, 9, 10, and 11 are associated with respective PRACH indexes 1, 0, 3, 2, 5, and 4, respectively. Along the column with the SG index 4, the SGs within the sub-group 403 with the subcarrier indexes 0, 1, 2, 3, 4, and 5 are associated with respective PRACH indexes 0, 1, 2, 3, 4, and 5, respectively; and the SGs within the sub-group 401 with the subcarrier indexes 6, 7, 8, 9, 10, and 11 are associated with respective PRACH indexes 0, 1, 2, 3, 4, and 5, respectively. Along the column with the SG index 5, the SGs within the sub-group 403 with the subcarrier indexes 0, 1, 2, 3, 4, and 5 are associated with respective PRACH indexes 1, 0, 3, 2, 5, and 4, respectively; and the SGs within the sub-group 401 with the subcarrier indexes 6, 7, 8, 9, 10, and 11 are associated with respective PRACH indexes 1, 0, 3, 2, 5, and 4, respectively. Along the column with the SG index 6, the SGs within the sub-group 403 with the subcarrier indexes 0, 1, 2, 3, 4, and 5 are associated with respective PRACH indexes 0, 1, 2, 3, 4, and 5, respectively; and the SGs within the sub-group 401 with the subcarrier indexes 6, 7, 8, 9, 10, and 11 are associated with respective PRACH indexes 0, 1, 2, 3, 4, and 5, respectively. Along the column with the SG index 7, the SGs within the sub-group 401 with the subcarrier indexes 0, 1, 2, 3, 4, and 5 are associated with respective PRACH indexes 0, 1, 2, 3, 4, and 5, respectively; and the SGs within the sub-group 403 with the subcarrier indexes 6, 7, 8, 9, 10, and 11 are associated with respective PRACH indexes 0, 1, 2, 3, 4, and 5, respectively. Along the column with the SG index 8, the SGs within the sub-group 401 with the subcarrier indexes 0, 1, 2, 3, 4, and 5 are associated with respective PRACH indexes 1, 0, 3, 2, 5, and 4, respectively; and the SGs within the sub-group 403 with the subcarrier indexes 6, 7, 8, 9, 10, and 11 are associated with respective PRACH indexes 1, 0, 3, 2, 5, and 4, respectively.

The above-discussed distribution of PRACH indexes of the SG map 400 is pre-defined in accordance with a first frequency/time hopping rule that can be used by a UE (e.g., 104 of FIG. 1) to send a Preamble to a BS (e.g., 102 of FIG. 1) for initiating a random access procedure, in accordance with some embodiments. In accordance with some embodiments of the present disclosure, the first frequency/time hopping rule indicates that the Preamble is sent using at least 8 SGs (i.e., the Preamble includes at least 8 SGs), each of which is selected from a respective SG index. Further, the first frequency/time hopping rule indicates that either the sub-group 401 or 403 is selected, and subsequently, a first SG can be randomly chosen from the first column (i.e., the column with the SG index 1) of the SG map 400 within the selected sub-group. Next, subsequent (e.g., remaining) SGs of the at least 8 SGs are each chosen from a respective column (i.e., the columns with SG indexes 2, 3, 4, 5, 6, 7, and 8) within the selected sub-group, wherein all 8 SGs share a same PRACH index, or alternatively, a first set of 4 SGs shares a first PRACH index and a second set of 4 SGs shares a second PRACH index.

In another embodiment, the first frequency/time hopping rule includes: randomly selecting an SG from the first column as the first SG of the at least 8 SGs; based on a respective sub-carrier index of the randomly selected SG in the first column, determining which of the sub-groups and which PRACH index to be used for the remaining 7 SGs of the at least 8 SGs.

In yet another embodiment, the first frequency/time hopping rule includes: randomly selecting an SG from the first column as the first SG of the at least 8 SGs; based on a respective sub-carrier index of the randomly selected SG in the first column, determining which of the sub-groups and which PRACH index to be used for the second, third, fourth SGs of the at least 8 SGs; randomly selecting an SG from the fifth column as the fifth SG of the at least 8 SGs within the sub-group that is selected by the first SG; based on a respective sub-carrier index of the randomly selected SG in the fifth column, determining which of the sub-groups and which PRACH index to be used for the sixth, seventh, eighth SGs of the at least 8 SGs. More specifically, a sub-carrier index of an $(n+1)^{th}$ SG within the at least 8 SGs can be determined by one of the following equations (1) and (2)

wherein
$N_{sc}^{RA}$ is the number of subcarrier spacings within the SG map 400, and $N_{sc}^{RA}=12$;
$\tilde{n}_{SC}^{RA}(i)$ is the sub-carrier index of the $(i+1)^{th}$ SG within the $N_{sc}^{RA}$ subcarriers, i is an integer, and $i \geq 0$;
$\tilde{n}_{SC}^{RA}(0)$ is the selected sub-carrier index of the $1^{th}$ SG;
a pseudo random sequence c(n) is given as below:
Pseudo-random sequences are defined by a length-31 Gold sequence. The output sequence c(n) of length $M_{PN}$, where n=0, 1, . . . , $M_{PN}-1$, is defined by $$c(n) = (x_1(n+N_C) + x_2(n+N_C)) \bmod 2$$
$$x_1(n+31) = (x_1(n+3) + x_1(n)) \bmod 2$$
$$x_2(n+31) = (x_2(n+3) + x_2(n+2) + x_2(n+1)x_2(n)) \bmod 2$$

where $N_C=1600$ and the first m-sequence shall be initialized with $x_1(0)=1$, $x_1(n)=0$, n=1, 2, . . . , 30. The initialization of the second m-sequence is denoted by $c_{init}=\sum_{i=0}^{30} x_2(i) \cdot 2^i$, and the pseudo random sequence generator shall be initialized with $$c_{init} = (32 \cdot N_{ID}^{Ncell} + cc + 1)((1024 \cdot n_{hf} + n_f) \bmod 79 + 1)^2 \cdot 2^9 + 32 \cdot N_{ID}^{Ncell} + cc,$$

wherein,
$N_{ID}^{Ncell}$ is the Cell Identity (Cell ID);
cc is the component carrier index in which PRACH resource is allocated;
$n_{hf}$ is the hyper frame index;
$n_f$ is the frame index As such, the Preamble follows a corresponding Preamble format when the first frequency/time hopping rule is applied.
In an embodiment, when the first frequency/time hopping rule is applied and the Preamble is sent using more than 8

$$\tilde{n}_{sc}^{RA}(i) = \begin{cases} (\tilde{n}_{sc}^{RA}(0) + f(i/4)) \bmod (N_{sc}^{RA}/2) + 6 \cdot ((i/4) \bmod 2) & i \bmod 4 = 0 \text{ and } i > 0 \text{ and } 0 \leq \tilde{n}_{sc}^{RA}(0) < 6 \\ (\tilde{n}_{sc}^{RA}(0) + f(i/4)) \bmod (N_{sc}^{RA}/2) + 6 \cdot ((i/4 - 1) \bmod 2) & i \bmod 4 = 0 \text{ and } i > 0 \text{ and } 6 \leq \tilde{n}_{sc}^{RA}(0) < N_{sc}^{RA} \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases} \quad \text{Equation (1)}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

$$\tilde{n}_{sc}^{RA}(i) = \begin{cases} (\tilde{n}_{sc}^{RA}(0) + f(i/4)) \bmod (N_{sc}^{RA}/2) + 6 \cdot ((i/4 + \text{floor}(\tilde{n}_{sc}^{RA}(0)/6)) \bmod 2) & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases} \quad \text{Equation (2)}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0,$$

SGs, e.g., 16 SGs, respective subcarrier indexes of a first SG of a first set of 8 SGs and a first SG of a second set of 8 SGs may be randomly selected.

FIGS. 4B and 4C provide two exemplary Preamble formats 420 and 440 that can be used by a Preamble including at least 8 SGs when the first frequency/time hopping rule is applied. As mentioned above, one of the sub-groups 401 and 403 is selected. In FIG. 4B, the sub-group 401 is selected. Next, within the sub-group 401, a first SG with a corresponding subcarrier index is randomly chosen from the first column (the SG index=1) of the SG map 400. In an example, the subcarrier index "0" is chosen as the first SG from the first column, which causes the first SG to be associated with the PRACH index 0 (within the sub-group 401). Following the first frequency/time hopping rule, each of the remaining 7 SGs is chosen from a respective column within the sub-group 401 and having the same PRACH index as the first SG. As such, from the second column (the SG index=2), the SG with the subcarrier index "1" is chosen as a second SG since it is associated with the PRACH index 0; from the third column (the SG index=3), the SG with the subcarrier index "7" is chosen as a third SG since it is associated with the PRACH index 0; from the fourth column (the SG index=4), the SG with the subcarrier index "6" is chosen as a fourth SG since it is associated with the PRACH index 0; from the fifth column (the SG index=5), the SG with the subcarrier index "7" is chosen as a fifth SG since it is associated with the PRACH index 0; from the sixth column (the SG index=6), the SG with the subcarrier index "6" is chosen as a sixth SG since it is associated with the PRACH index 0; from the seventh column (the SG index=7), the SG with the subcarrier index "0" is chosen as a seventh SG since it is associated with the PRACH index 0; from the eighth column (the SG index=8), the SG with the subcarrier index "1" is chosen as an eighth SG since it is associated with the PRACH index 0.

In some embodiments, when using the first frequency/time hopping rule to provide the Preamble format 420, the first SG with a subcarrier index, e.g., subcarrier index "k," is chosen within the sub-group 401, wherein k is randomly chosen and is 0 in the above example, and the remaining SGs (second, third, fourth, fifth, sixth, seventh, and eighth SGs) are chosen as follows. The second SG is chosen to hop "upwardly" from the first SG by 1 subcarrier index, e.g., from "k" to "k+1;" the third SG is chosen to hop "upwardly" from the second SG by 6 subcarrier indexes, e.g., from "k+1" to "k+7;" the fourth SG is chosen to hop "downwardly" from the third SG by 1 subcarrier index, e.g., from "k+7" to "k+6." The fifth SG with a subcarrier index, e.g., subcarrier index "n," is chosen, wherein n is not limited by the subcarrier index k and is 7 in the above example; the sixth SG is chosen to hop "upwardly" from the fifth SG by 1 subcarrier index, e.g., from "n" to "n+1;" the seventh SG is chosen to hop "downwardly" from the sixth SG by 6 subcarrier indexes, e.g., from "n+1" to "n−5;" the eighth SG is chosen to hop "downwardly" from the seventh SG by 1 subcarrier index, e.g., from "n−5" to "n−6."

The Preamble format 440 illustrated in FIG. 4C is substantially similar to the Preamble format 420 except that the sub-group 403 is selected. Thus, the Preamble format 440 is discussed briefly as follows. In the Preamble format 440, the first SG is with a subcarrier index, e.g., subcarrier index "k," wherein k is randomly chosen; the second SG hops "upwardly" from the first SG by 1 subcarrier index, e.g., from "k" to "k+1;" the third SG hops "downwardly" from the second SG by 6 subcarrier indexes, e.g., from "k+1" to "k−5;" the fourth SG hops "downwardly" from the third SG by 1 subcarrier index, e.g., from "k−5" to "k−6." The fifth SG is with a subcarrier index, e.g., subcarrier index "n," wherein n is not limited by the subcarrier index k; the sixth SG hops "upwardly" from the fifth SG by 1 subcarrier index, e.g., from "n" to "n+1;" the seventh SG hops "upwardly" from the sixth SG by 6 subcarrier indexes, e.g., from "n+1" to "n+7;" the eighth SG hops "downwardly" from the seventh SG by 1 subcarrier index, e.g., from "n+7" to "n+6."

It is noted that, in such an embodiment, at least two upward frequency hoppings and at least two downward frequency hoppings that each crosses over 1 subcarrier index and at least one upward frequency hopping and at least one downward frequency hopping that each crosses over 6 subcarrier indexes are present in each of the Preamble formats 420 and 440. Accordingly, the Preamble, using either the Preamble format 420 or 440, can follow a hopping pattern that includes a first hopping path associated with a first plurality of increasing subcarrier spacings, which correspond to a first plurality of increasing subcarrier indexes in the current example (e.g., from k+1 to k+7 in the format 420, from n+1 to n+7 in format 440, etc.), a second hopping path associated with a second plurality of decreasing subcarrier spacings, which correspond to a second plurality of decreasing subcarrier indexes in the current example (e.g., from n+1 to n−5 in the format 420, from k+1 to k−5 in the format 440), a third hopping path associated with 1 increasing subcarrier spacing (e.g., from k to k+1 in the format 420, from k to k+1 in the format 440), a fourth hopping path associated with 1 decreasing subcarrier spacing (e.g., from k+7 to k+6 in the format 420, from k−5 to k−6 in the format 440), a fifth hopping path associated with 1 increasing subcarrier spacing (e.g., from n to n+1 in the format 420, from n to n+1 in the format 440), and a sixth hopping path associated with 1 decreasing subcarrier spacing (e.g., from n−5 to n−6 in the format 420, from n+7 to n+6 in the format 440). Further, in some embodiments, respective frequency intervals (or typically known as frequency hopping distances) of the first and second hopping paths may be equal to each other. In some alternative embodiments, such frequency intervals of the first and second hopping paths may be each of an integral times or a fractional times a respective subcarrier spacing (e.g., 3.75 kHz). Alternatively stated, the first plurality of increasing subcarrier spacings and the second plurality of decreasing subcarrier spacings may be each an integral times or a fractional times the 3.75 kHz subcarrier spacing in the current example.

Figure 5A:
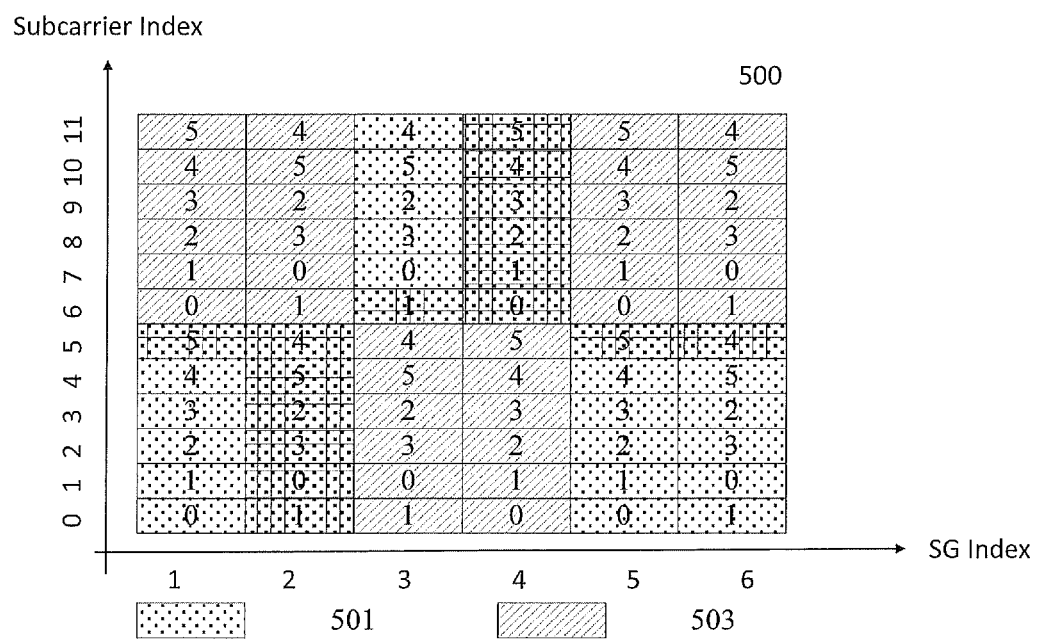
FIG. 5A illustrates another exemplary symbol group map, in accordance with some embodiments of the present disclosure.
Figure 5B:
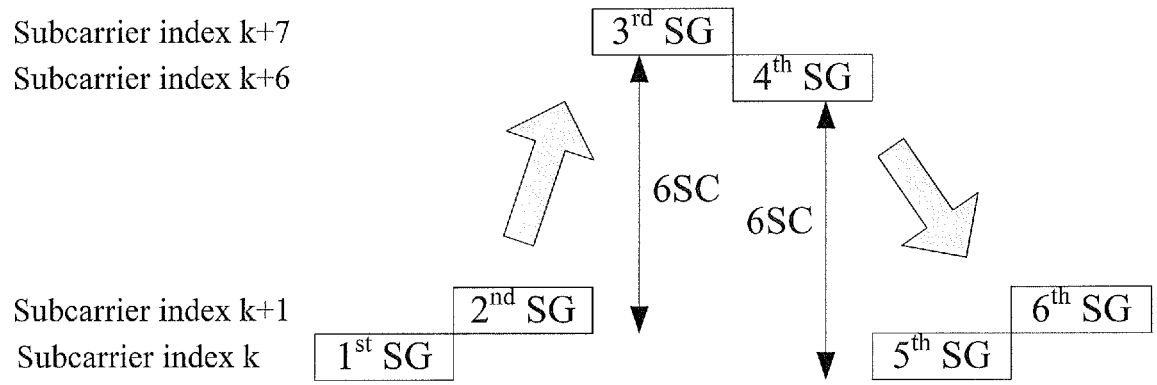
FIGS. 5B and 5C respectively illustrate exemplary formats of a preamble signal when the symbol group map of FIG. 5A is used, in accordance with some embodiments of the present disclosure.
Figure 5C:
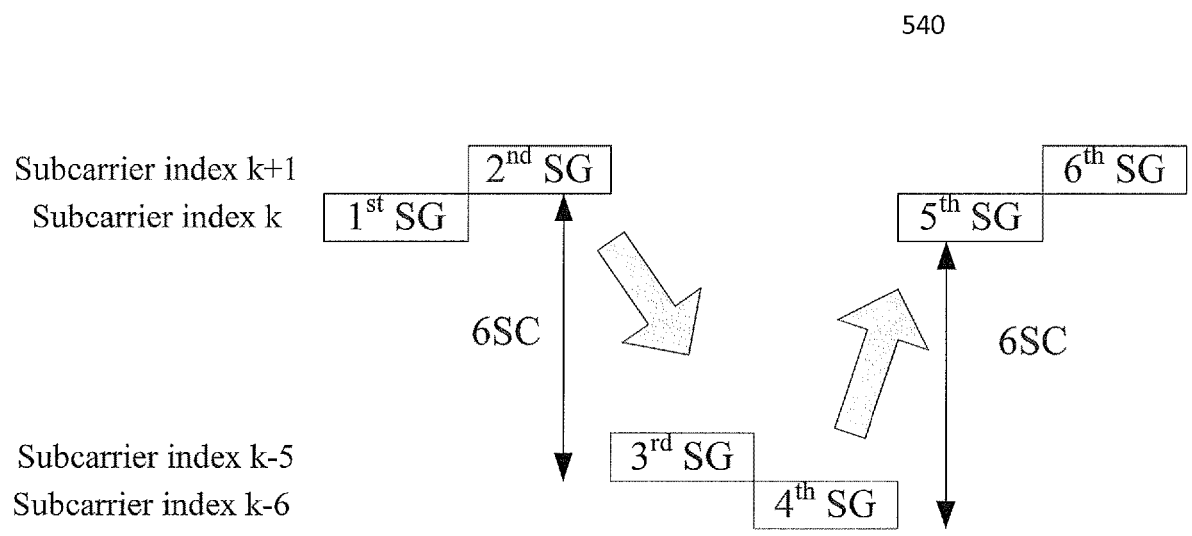

In another embodiment, when an SG is defined based on the subcarrier spacing of 3.75 kHz (e.g., the SG 302), another disclosed Preamble format, which will be discussed with respect to FIGS. 5B and 5C, is decided based on a respective pre-defined SG map 500 as illustrated in FIG. 5A. In the illustrated embodiment of FIG. 5A, the SG map 500 includes 72 SGs, each of which may be implemented by the SG 302. More specifically, in some embodiments, the SG map 500 extends across 6 SGs with corresponding time durations (9.6 ms) in the time domain, and across 12 SGs, i.e., 12 contiguous subcarrier spacings in the frequency domain (180 kHz), respectively. In the time domain, each SG is associated with a respective SG index (e.g., SG index 1, 2, 3, 4, 5, or 6); and in the frequency domain, each SG is associated with a respective subcarrier index (e.g., subcarrier index 0, 1, 2, 3, 4, 5, 6, 7, 8, 9, 10, or 11).

According to some embodiments, the SG map 500 are divided into two sub-groups 501 and 503, which are filled with a dotted pattern and a diagonal stripes pattern, respectively, as shown in FIG. 5A. In some embodiments, in the SG map 500, the SGs sharing a common SG index (i.e., along a same column of the SG map 500) has a half that belongs to the sub-group 501 and the other half that belongs to the sub-group 503. Further, along one of the columns of the SG map 500, each of the SGs, belonging to the sub-group 501, is associated with a respective PRACH index that is selected from one of 0, 1, 2, 3, 4, and 5; and each of the SGs, belonging to the sub-group 503, is associated with a respective PRACH index that is selected from one of 0, 1, 2, 3, 4, and 5. In some embodiments, respective distributions of the PRACH indexes in terms of SG index/subcarrier index within each sub-group are pre-defined, as provided below.

For example, along the column with the SG index 1, the SGs within the sub-group 501 with the subcarrier indexes 0, 1, 2, 3, 4, and 5 are associated with respective PRACH indexes 0, 1, 2, 3, 4, and 5, respectively; and the SGs within the sub-group 503 with the subcarrier indexes 6, 7, 8, 9, 10, and 11 are associated with respective PRACH indexes 0, 1, 2, 3, 4, and 5, respectively. Along the column with the SG index 2, the SGs within the sub-group 501 with the subcarrier indexes 0, 1, 2, 3, 4, and 5 are associated with respective PRACH indexes 1, 0, 3, 2, 5, and 4, respectively; and the SGs within the sub-group 503 with the subcarrier indexes 6, 7, 8, 9, 10, and 11 are associated with respective PRACH indexes 1, 0, 3, 2, 5, and 4, respectively. Along the column with the SG index 3, the SGs within the sub-group 503 with the subcarrier indexes 0, 1, 2, 3, 4, and 5 are associated with respective PRACH indexes 1, 0, 3, 2, 5, and 4, respectively; and the SGs within the sub-group 501 with the subcarrier indexes 6, 7, 8, 9, 10, and 11 are associated with respective PRACH indexes 1, 0, 3, 2, 5, and 4, respectively. Along the column with the SG index 4, the SGs within the sub-group 503 with the subcarrier indexes 0, 1, 2, 3, 4, and 5 are associated with respective PRACH indexes 0, 1, 2, 3, 4, and 5, respectively; and the SGs within the sub-group 501 with the subcarrier indexes 6, 7, 8, 9, 10, and 11 are associated with respective PRACH indexes 0, 1, 2, 3, 4, and 5, respectively. Along the column with the SG index 5, the SGs within the sub-group 501 with the subcarrier indexes 0, 1, 2, 3, 4, and 5 are associated with respective PRACH indexes 0, 1, 2, 3, 4, and 5, respectively; and the SGs within the sub-group 503 with the subcarrier indexes 6, 7, 8, 9, 10, and 11 are associated with respective PRACH indexes 0, 1, 2, 3, 4, and 5, respectively. Along the column with the SG index 6, the SGs within the sub-group 501 with the subcarrier indexes 0, 1, 2, 3, 4, and 5 are associated with respective PRACH indexes 1, 0, 3, 2, 5, and 4, respectively; and the SGs within the sub-group 503 with the subcarrier indexes 6, 7, 8, 9, 10, and 11 are associated with respective PRACH indexes 1, 0, 3, 2, 5, and 4, respectively.

The above-discussed distribution of PRACH indexes of the SG map 500 is pre-defined in accordance with a second frequency/time hopping rule that can be used by a UE (e.g., 104 of FIG. 1) to send a Preamble to a BS (e.g., 102 of FIG. 1) for initiating a random access procedure. In accordance with some embodiments of the present disclosure, the second frequency/time hopping rule indicates that the Preamble is sent using at least 6 SGs (i.e., the Preamble includes at least 6 SGs), each of which is selected from a respective SG index. Further, the second frequency/time hopping rule indicates that either the sub-group 501 or 503 is selected, and subsequently, a first SG can be randomly chosen from the first column (i.e., the column with the SG index 1) of the SG map 500 within the selected sub-group. Next, subsequent (e.g., remaining) SGs of the at least 6 SGs are each chosen from a respective column (i.e., the columns with SG indexes 2, 3, 4, 5, and 6) within the selected sub-group, wherein all 6 SGs share a same PRACH index. In an alternative embodiment, the second frequency/time hopping rule includes: randomly selecting an SG from the first column as the first SG of the at least 6 SGs; based on a respective sub-carrier index of the randomly selected SG in the first column, determining which of the sub-groups and which PRACH index to be used for the remaining 5 SGs of the at least 6 SGs. As such, the Preamble follows a corresponding Preamble format when the second frequency/time hopping rule is applied.

In an embodiment, when the second frequency/time hopping rule is applied and the Preamble is sent using more than 6 SGs, e.g., 12 SGs, respective subcarrier indexes of a first SG of a first set of 6 SGs and a first SG of a second set of 6 SGs may be randomly selected.

FIGS. 5B and 5C provide two exemplary Preamble formats 520 and 540 that can be used by a Preamble including at least 6 SGs when the second frequency/time hopping rule is applied. As mentioned above, one of the sub-groups 501 and 503 is first selected. In FIG. 5B, the sub-group 501 is selected. Next, a first SG within the sub-group 501 with a subcarrier index, e.g., subcarrier index "k," is chosen, wherein k is randomly chosen, and the remaining SGs (second, third, fourth, fifth, and sixth SGs) are chosen as follows. The second SG is chosen to hop "upwardly" from the first SG by 1 subcarrier index, e.g., from "k" to "k+1;" the third SG is chosen to hop "upwardly" from the second SG by 6 subcarrier indexes, e.g., from "k+1" to "k+7;" the fourth SG is chosen to hop "downwardly" from the third SG by 1 subcarrier index, e.g., from "k+7" to "k+6;" the fifth SG is chosen to hop "downwardly" from the fourth SG by 6 subcarrier indexes, e.g., from "k+6" to "k;" and the sixth SG is chosen to hop "upwardly" from the fifth SG by 1 subcarrier index, e.g., from "k" to "k+1."

The Preamble format 540 illustrated in FIG. 5C is substantially similar to the Preamble format 520 except that the sub-group 503 is chosen. Thus, the Preamble format 540 is discussed briefly as follows. In the Preamble format 540, the first SG is with a subcarrier index, e.g., subcarrier index "k," wherein k is randomly chosen; the second SG hops "upwardly" from the first SG by 1 subcarrier index, e.g., from "k" to "k+1;" the third SG hops "downwardly" from the second SG by 6 subcarrier indexes, e.g., from "k+1" to "k−5;" the fourth SG hops "downwardly" from the third SG by 1 subcarrier index, e.g., from "k−5" to "k−6;" the fifth SG hops "upwardly" from the fourth SG by 6 subcarrier indexes, e.g., from "k−6" to "k;" the sixth SG hops "upwardly" from the fifth SG by 1 subcarrier index, e.g., from "k" to "k+1."

It is noted that, in such an embodiment, at least two upward frequency hoppings, at least one downward frequency hopping that each crosses over 1 subcarrier index and at least one upward frequency hopping and at least one downward frequency hopping that each crosses over 6 subcarrier indexes are present in each of the Preamble formats 520 and 540. Accordingly, the Preamble, using either the Preamble format 520 or 540, can follow a hopping pattern that includes a first hopping path associated with a first plurality of increasing subcarrier spacings, which correspond to a first plurality of increasing subcarrier indexes in the current example (e.g., from k+1 to k+7 in the format 520, from k−6 to k in format 540, etc.), a second hopping path associated with a second plurality of decreasing subcarrier spacings, which correspond to a second plurality of decreasing subcarrier indexes in the current example (e.g., from k+6 to k in the format 520, from k+1 to k−5 in the format 540), a third hopping path associated with 1 increasing subcarrier spacing (e.g., from k to k+1 in the format 520, from k to k+1 in the format 540), a fourth hopping path associated with 1 decreasing subcarrier spacing (e.g., from k+7 to k+6 in the format 520, from k−5 to k−6 in the format 540), and a fifth hopping path associated with 1 increasing subcarrier spacing (e.g., from k to k+1 in the format 520, from k to k+1 in the format 540). Further, in some embodiments, respective frequency intervals (or typically known as frequency hopping distances) of the first and second hopping paths may be equal to each other. In some alternative embodiments, such frequency intervals of the first and second hopping paths may be each of an integral times or a fractional times a respective subcarrier spacing (e.g., 3.75 kHz). Alternatively stated, the first plurality of increasing subcarrier spacings and the second plurality of decreasing subcarrier spacings may be each an integral times or a fractional times the 3.75 kHz subcarrier spacing in the current example.

Figure 6A:
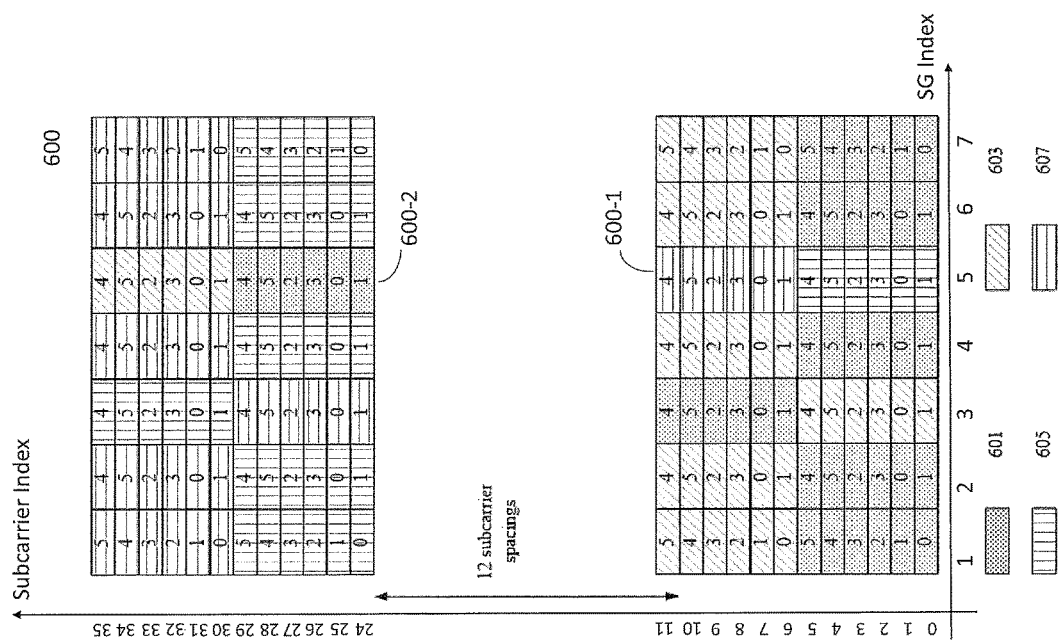
FIG. 6A illustrates yet another exemplary symbol group map, in accordance with some embodiments of the present disclosure.
Figure 6B:
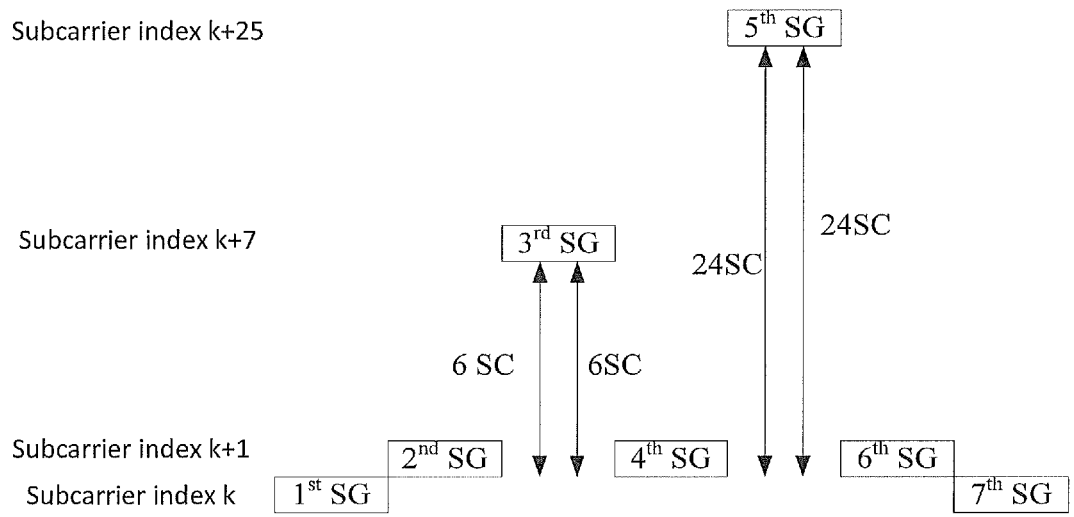
FIG. 6B illustrates an exemplary format of a preamble signal when the symbol group map of FIG. 6A is used, in accordance with some embodiments of the present disclosure.

In yet another embodiment, when an SG is defined based on the subcarrier spacing of 1.25 kHz (e.g., the SG 304), a disclosed Preamble format, which will be discussed with respect to FIG. 6B, is decided based on a pre-defined SG map 600 as illustrated in FIG. 6A. In the illustrated embodiment of FIG. 6A, the SG map 600 includes 168 SGs, each of which may be implemented by the SG 304. More specifically, in some embodiments, the SG map 600 includes two portions 600-1 and 600-2 spaced from each other by 12 contiguous subcarrier spacings in the frequency domain, and each of the portions 600-1 and 600-2 extends across 7 SGs with corresponding time durations (16.8 ms) in the time domain and across 12 SGs, i.e., 12 subcarrier spacings, (60 kHz) in the frequency domain, respectively. In the time domain, each SG is associated with a respective SG index (e.g., SG index 1, 2, 3, 4, 5, 6, or 7); and in the frequency domain, each SG is associated with a respective subcarrier index (e.g., subcarrier index 0, 1, 2, 3, 4, 5, 6, 7, 8, 9, 10, 11, 24, 25, 26, 27, 28, 29, 30, 31, 32, 33, 34, or 35). Because of the 12 contiguous subcarrier spacings between the portions 600-1 and 600-2, it is noted that subcarrier indexes between 11 and 24 are not contiguous.

According to some embodiments, the SG map 600 are divided into four sub-groups 601, 603, 605, and 607, which are filled with a dotted pattern, a diagonal stripes pattern, a vertical stripes pattern, and a horizontal stripes pattern, respectively, as shown in FIG. 6A. In some embodiments, in the SG map 600, the SGs sharing a common SG index (i.e., along a same column of the SG map 600) has a first quarter that belongs to the sub-group 601, a second quarter that belongs to the sub-group 603, a third quarter that belongs to the sub-group 605, and a fourth quarter that belongs to the sub-group 607. Further, along one of the columns of the SG map 600, each of the SGs, belonging to the sub-group 601, is associated with a respective PRACH (Physical Random Access Channel) index that is selected from one of 0, 1, 2, 3, 4, and 5; each of the SGs, belonging to the sub-group 603, is associated with a respective PRACH index that is selected from one of 0, 1, 2, 3, 4, and 5; each of the SGs, belonging to the sub-group 605, is associated with a respective PRACH index that is selected from one of 0, 1, 2, 3, 4, and 5; and each of the SGs, belonging to the sub-group 607, is associated with a respective PRACH index that is selected from one of 0, 1, 2, 3, 4, and 5. In some embodiments, respective distributions of the PRACH indexes in terms of SG index/subcarrier index within each sub-group are pre-defined, as provided below.

For example, along the column with the SG index 1, the SGs within the sub-group 601 with the subcarrier indexes 0, 1, 2, 3, 4, and 5 are associated with respective PRACH indexes 0, 1, 2, 3, 4, and 5, respectively; the SGs within the sub-group 603 with the subcarrier indexes 6, 7, 8, 9, 10, and 11 are associated with respective PRACH indexes 0, 1, 2, 3, 4, and 5, respectively; the SGs within the sub-group 605 with the subcarrier indexes 24, 25, 26, 27, 28, and 29 are associated with respective PRACH indexes 0, 1, 2, 3, 4, and 5, respectively; the SGs within the sub-group 607 with the subcarrier indexes 30, 31, 32, 33, 34, and 35 are associated with respective PRACH indexes 0, 1, 2, 3, 4, and 5, respectively. Similarly, along each of other columns of the SG map 600, the SGs belonging to each sub-group are each associated with a corresponding PRACH index in terms of the sub-carrier index, as illustrated in FIG. 6A. Thus, for purposes of brevity, discussions of the PRACH indexes for the SGs along columns with SG indexes 2-7 are not repeated here.

The above-discussed distribution of PRACH indexes of the SG map 600 is pre-defined in accordance with a third frequency/time hopping rule that can be used by a UE (e.g., 104 of FIG. 1) to send a Preamble to a BS (e.g., 102 of FIG. 1) for initiating a random access procedure. In accordance with some embodiments of the present disclosure, the third frequency/time hopping rule indicates that the Preamble is sent using at least 7 SGs (i.e., the Preamble includes at least 7 SGs), each of which is selected from a respective SG index. Further, the third frequency/time hopping rule indicates that one of the sub-groups 601, 603, 605, and 607 is selected, and subsequently, a first SG can be randomly chosen from the first column (i.e., the column with the SG index 1) of the SG map 600 within the selected sub-group. Next, subsequent (e.g., remaining) SGs of the at least 7 SGs are each chosen from a respective column (i.e., the columns with SG indexes 2, 3, 4, 5, 6, and 7) within the selected sub-group, wherein all 7 SGs share a same PRACH index. In an alternative embodiment, the third frequency/time hopping rule includes: randomly selecting an SG from the first column as the first SG of the at least 7 SGs; based on a respective sub-carrier index of the randomly selected SG in the first column, determining which of the sub-groups and which PRACH index to be used for the remaining 6 SGs of the at least 7 SGs. As such, the Preamble follows a corresponding Preamble format when the third frequency/time hopping rule is applied.

In an embodiment, when the third frequency/time hopping rule is applied and the Preamble is sent using more than 7 SGs, e.g., 14 SGs, respective subcarrier indexes of a first SG of a first set of 7 SGs and a first SG of a second set of 7 SGs may be randomly selected.

FIG. 6B provides an exemplary Preamble format 620 that can be used by a Preamble including at least 7 SGs when the third frequency/time hopping rule is applied. As mentioned above, one of the sub-groups 601, 603, 605, and 607 is selected. In FIG. 6B, the sub-group 601 is selected, for example. Next, a first SG within the sub-group 601 with a subcarrier index, e.g., subcarrier index "k," is chosen, wherein k is randomly chosen, and the remaining SGs (second, third, fourth, fifth, sixth, and seventh SGs) are chosen as follows. The second SG is chosen to hop "upwardly" from the first SG by 1 subcarrier index, e.g., from "k" to "k+1;" the third SG is chosen to hop "upwardly" from the second SG by 6 subcarrier indexes, e.g., from "k+1" to "k+7;" the fourth SG is chosen to hop "downwardly" from the third SG by 6 subcarrier indexes, e.g., from "k+7" to "k+1;" the fifth SG is chosen to hop "upwardly" from the fourth SG by 24 subcarrier indexes, e.g., from "k+1" to "k+25;" the sixth SG is chosen to hop "downwardly" from the fifth SG by 24 subcarrier indexes, e.g., from "k+25" to "k+1;" and the seventh SG is chosen to hop "downwardly" from the sixth SG by 1 subcarrier index, e.g., from "k+1" to "k."

It is noted that, in such an embodiment, at least one upward frequency hopping and at least one downward frequency hoppings that each crosses over 1 subcarrier index, at least two upward frequency hoppings that each crosses over 6 and 24 subcarrier indexes, respectively, and at least two downward frequency hoppings that each crosses over 6 and 24 subcarrier indexes, respectively, are present in the Preamble format 620. Accordingly, the Preamble, using the Preamble format 620, can follow a hopping pattern that includes a first hopping path associated with a first plurality of increasing subcarrier indexes (e.g., from k+1 to k+7), a second hopping path associated with a second plurality of decreasing subcarrier indexes (e.g., from k+7 to k+1), a third hopping path associated with a third plurality of increasing subcarrier indexes (e.g., from k+1 to k+25), a fourth hopping path associated with a fourth plurality of decreasing subcarrier indexes (e.g., from k+25 to k+1), a fifth hopping path associated with 1 increasing subcarrier spacing (e.g., from k to k+1 in the format 620), and a sixth hopping path associated with 1 decreasing subcarrier spacing (e.g., from k+1 to k in the format 620).

Further, in some embodiments, respective frequency intervals (or typically known as frequency hopping distances) of the first and second hopping paths may be equal to each other, and respective frequency intervals of the third and fourth hopping paths may be equal to each other. In some alternative embodiments, such frequency intervals of the first, second, third, and fourth hopping paths may be each of an integral times or a fractional times a respective subcarrier spacing (e.g., 1.25 kHz). Alternatively stated, the first plurality of increasing subcarrier spacings, the second plurality of decreasing subcarrier spacings, the third plurality of increasing subcarrier spacings, and the fourth plurality of decreasing subcarrier spacings may be each an integral times or a fractional times the 1.25 kHz subcarrier spacing in the current example.

Figure 7A:
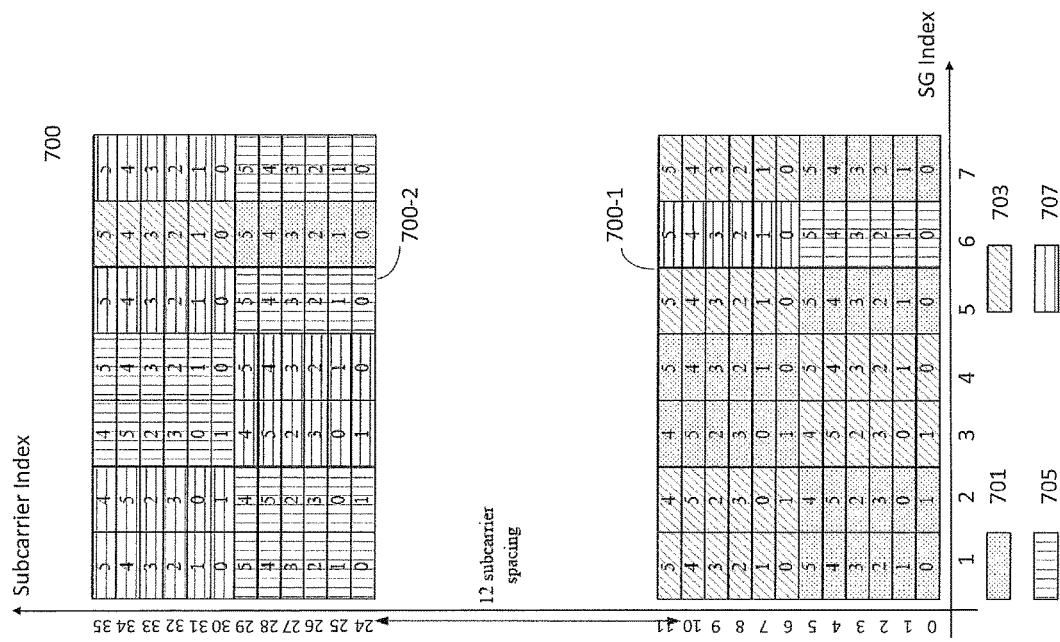
FIG. 7A illustrates yet another exemplary symbol group map, in accordance with some embodiments of the present disclosure.
Figure 7B:
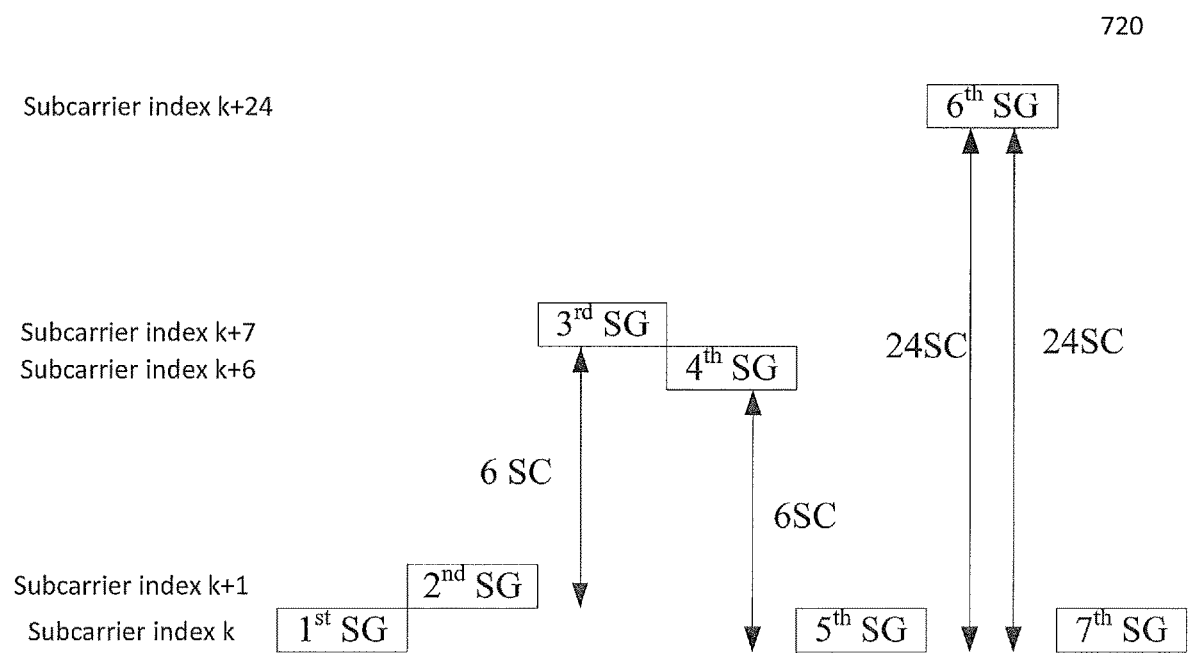
FIG. 7B illustrates an exemplary format of a preamble signal when the symbol group map of FIG. 7A is used, in accordance with some embodiments of the present disclosure.

Still in yet another embodiment, when an SG is defined based on the subcarrier spacing of 1.25 kHz (e.g., the SG 304), another disclosed Preamble format, which will be discussed with respect to FIG. 7B, is decided based on a pre-defined SG map 700 as illustrated in FIG. 7A. In the illustrated embodiment of FIG. 7A, the SG map 700 includes 168 SGs, each of which may be implemented by the SG 304. More specifically, in some embodiments, the SG map 700 includes two portions 700-1 and 700-2 spaced from each other by 12 contiguous subcarrier spacings in the frequency domain, and each of the portions 700-1 and 700-2 extends across 7 SGs with corresponding time durations (16.8 ms) in the time domain and across 12 SGs, i.e., 12 subcarrier spacings, (60 kHz) in the frequency domain, respectively. In the time domain, each SG is associated with a respective SG index (e.g., SG index 1, 2, 3, 4, 5, 6, or 7); and in the frequency domain, each SG is associated with a respective subcarrier index (e.g., subcarrier index 0, 1, 2, 3, 4, 5, 6, 7, 8, 9, 10, 11, 24, 25, 26, 27, 28, 29, 30, 31, 32, 33, 34, or 35). Because of the 12 contiguous subcarrier spacings between the portions 700-1 and 700-2, it is noted that subcarrier indexes between 11 and 24 are not contiguous.

According to some embodiments, the SG map 700 are divided into four sub-groups 701, 703, 705, and 707, which are filled with a dotted pattern, a diagonal stripes pattern, a vertical stripes pattern, and a horizontal stripes pattern, respectively, as shown in FIG. 7A. In some embodiments, in the SG map 700, the SGs sharing a common SG index (i.e., along a same column of the SG map 700) has a first quarter that belongs to the sub-group 701, a second quarter that belongs to the sub-group 703, a third quarter that belongs to the sub-group 705, and a fourth quarter that belongs to the sub-group 707. Further, along one of the columns of the SG map 700, each of the SGs, belonging to the sub-group 701, is associated with a respective PRACH (Physical Random Access Channel) index that is selected from one of 0, 1, 2, 3, 4, and 5; each of the SGs, belonging to the sub-group 703, is associated with a respective PRACH index that is selected from one of 0, 1, 2, 3, 4, and 5; each of the SGs, belonging to the sub-group 705, is associated with a respective PRACH index that is selected from one of 0, 1, 2, 3, 4, and 5; and each of the SGs, belonging to the sub-group 707, is associated with a respective PRACH index that is selected from one of 0, 1, 2, 3, 4, and 5. In some embodiments, respective distributions of the PRACH indexes in terms of SG index/subcarrier index within each sub-group are pre-defined, as provided below.

For example, along the column with the SG index 1, the SGs within the sub-group 701 with the subcarrier indexes 0, 1, 2, 3, 4, and 5 are associated with respective PRACH indexes 0, 1, 2, 3, 4, and 5, respectively; the SGs within the sub-group 703 with the subcarrier indexes 6, 7, 8, 9, 10, and 11 are associated with respective PRACH indexes 0, 1, 2, 3, 4, and 5, respectively; the SGs within the sub-group 705 with the subcarrier indexes 24, 25, 26, 27, 28, and 29 are associated with respective PRACH indexes 0, 1, 2, 3, 4, and 5, respectively; the SGs within the sub-group 707 with the subcarrier indexes 30, 31, 32, 33, 34, and 35 are associated with respective PRACH indexes 0, 1, 2, 3, 4, and 5, respectively. Similarly, along each of other columns of the SG map 700, the SGs belonging to each sub-group are each associated with a corresponding PRACH index in terms of the sub-carrier index, as illustrated in FIG. 7A. Thus, for purposes of brevity, discussions of the PRACH indexes for the SGs along columns with SG indexes 2-7 are not repeated here.

The above-discussed distribution of PRACH indexes of the SG map 700 is pre-defined in accordance with a fourth frequency/time hopping rule that can be used by a UE (e.g., 104 of FIG. 1) to send a Preamble to a BS (e.g., 102 of FIG. 1) for initiating a random access procedure. In accordance with some embodiments of the present disclosure, the fourth frequency/time hopping rule indicates that the Preamble is sent using at least 7 SGs (i.e., the Preamble includes at least 7 SGs), each of which is selected from a respective SG index. Further, the fourth frequency/time hopping rule indicates that one of the sub-groups 701, 703, 705, and 707 is selected, and subsequently, a first SG can be randomly chosen from the first column (i.e., the column with the SG index 1) of the SG map 700 within the selected sub-group. Next, subsequent (e.g., remaining) SGs of the at least 7 SGs are each chosen from a respective column (i.e., the columns with SG indexes 2, 3, 4, 5, 6, and 7) within the selected sub-group, wherein all 7 SGs share a same PRACH index. In an alternative embodiment, the fourth frequency/time hopping rule includes: randomly selecting an SG from the first column as the first SG of the at least 7 SGs; based on a respective sub-carrier index of the randomly selected SG in the first column, determining which of the sub-groups and which PRACH index to be used for the remaining 6 SGs of the at least 7 SGs. As such, the Preamble follows a corresponding Preamble format when the fourth frequency/time hopping rule is applied.

In an embodiment, when the fourth frequency/time hopping rule is applied and the Preamble is sent using more than 7 SGs, e.g., 14 SGs, respective subcarrier indexes of a first SG of a first set of 7 SGs and a first SG of a second set of 7 SGs may be randomly selected.

FIG. 7B provides an exemplary Preamble format 720 that can be used by a Preamble including at least 7 SGs when the fourth frequency/time hopping rule is applied. As mentioned above, one of the sub-groups 701, 703, 705, and 707 is selected. In FIG. 7B, the sub-group 701 is selected, for example. Next, a first SG within the sub-group 701 with a subcarrier index, e.g., subcarrier index "k," is chosen, wherein k is randomly chosen, and the remaining SGs (second, third, fourth, fifth, sixth, and seventh SGs) are chosen as follows. The second SG is chosen to hop "upwardly" from the first SG by 1 subcarrier index, e.g., from "k" to "k+1;" the third SG is chosen to hop "upwardly" from the second SG by 6 subcarrier indexes, e.g., from "k+1" to "k+7;" the fourth SG is chosen to hop "downwardly" from the third SG by 1 subcarrier index, e.g., from "k+7" to "k+6;" the fifth SG is chosen to hop "downwardly" from the fourth SG by 6 subcarrier indexes, e.g., from "k+6" to "k;" the sixth SG is chosen to hop "upwardly" from the fifth SG by 24 subcarrier indexes, e.g., from "k" to "k+24;" and the seventh SG is chosen to hop "downwardly" from the sixth SG by 24 subcarrier indexes, e.g., from "k+24" to "k."

It is noted that, in such an embodiment, at least one upward frequency hopping and at least one downward frequency hoppings that each crosses over 1 subcarrier index, at least two upward frequency hoppings that each crosses over 6 and 24 subcarrier indexes, respectively, and at least two downward frequency hoppings that each crosses over 6 and 24 subcarrier indexes, respectively, are present in the Preamble format 720. Accordingly, the Preamble, using the Preamble format 720, can follow a hopping pattern that includes a first hopping path associated with a first plurality of increasing subcarrier indexes (e.g., from k+1 to k+7), a second hopping path associated with a second plurality of decreasing subcarrier indexes (e.g., from k+6 to k), a third hopping path associated with a third plurality of increasing subcarrier indexes (e.g., from k to k+24), a fourth hopping path associated with a fourth plurality of decreasing subcarrier indexes (e.g., from k+24 to k), and a fifth hopping path associated with 1 increasing subcarrier spacing (e.g., from k to k+1 in the format 720), and a sixth hopping path associated with 1 decreasing subcarrier spacing (e.g., from k+7 to k+6 in the format 720).

Further, in some embodiments, respective frequency intervals (or typically known as frequency hopping distances) of the first and second hopping paths may be equal to each other, and respective frequency intervals of the third and fourth hopping paths may be equal to each other. In some alternative embodiments, such frequency intervals of the first, second, third, and fourth hopping paths may be each of an integral times or a fractional times a respective subcarrier spacing (e.g., 1.25 kHz). Alternatively stated, the first plurality of increasing subcarrier spacings, the second plurality of decreasing subcarrier spacings, the third plurality of increasing subcarrier spacings, and the fourth plurality of decreasing subcarrier spacings may be each an integral times or a fractional times the 1.25 kHz subcarrier spacing in the current example.

Figure 8A:
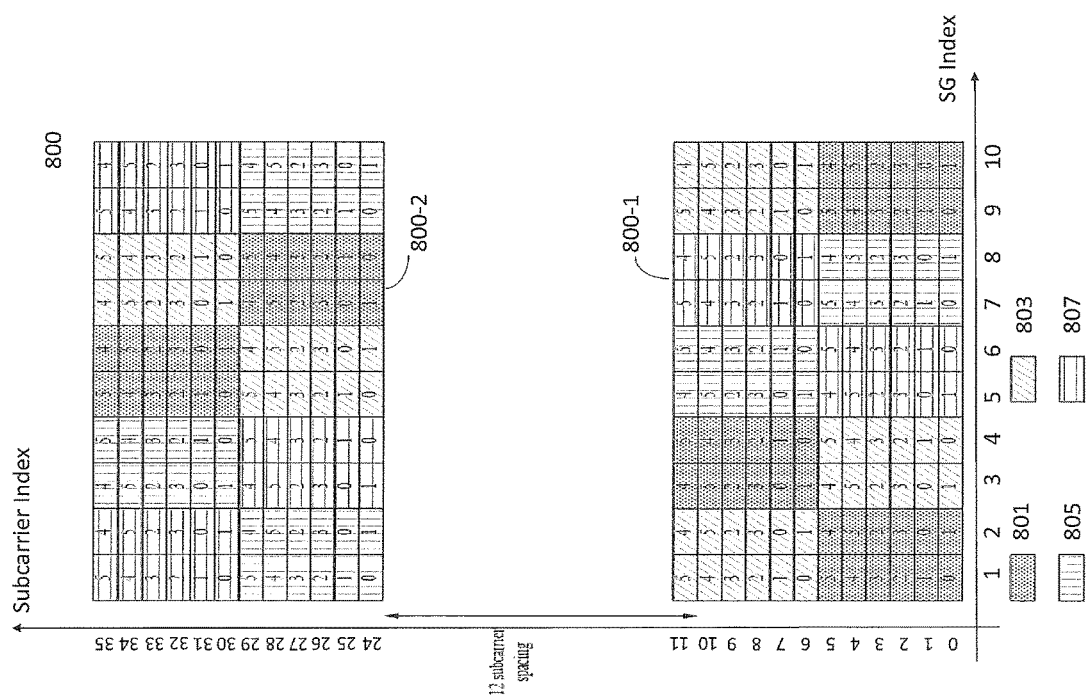
FIG. 8A illustrates yet another exemplary symbol group map, in accordance with some embodiments of the present disclosure.
Figure 8B:
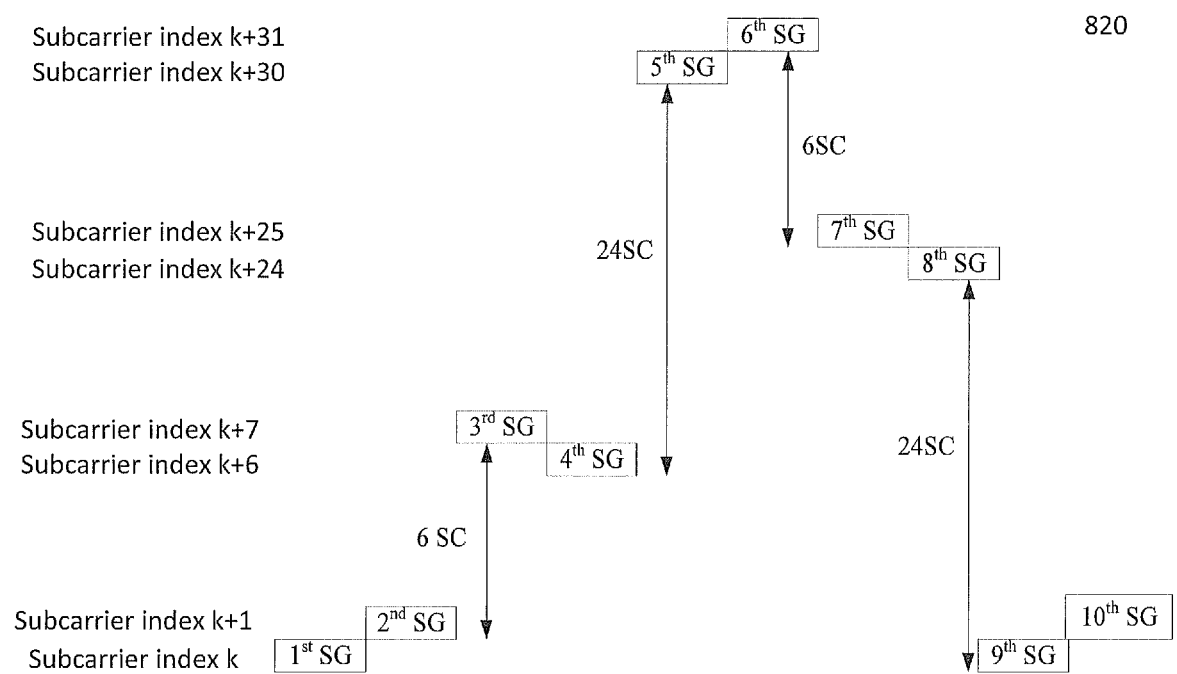
FIG. 8B illustrates an exemplary format of a preamble signal when the symbol group map of FIG. 8A is used, in accordance with some embodiments of the present disclosure.

Still in yet another embodiment, when an SG is defined based on the subcarrier spacing of 1.25 kHz (e.g., the SG 304), yet another disclosed Preamble format, which will be discussed with respect to FIG. 8B, is decided based on a pre-defined SG map 800 as illustrated in FIG. 8A. In the illustrated embodiment of FIG. 8A, the SG map 800 includes 240 SGs, each of which may be implemented by the SG 304. More specifically, in some embodiments, the SG map 800 includes two portions 800-1 and 800-2 spaced from each other by 12 contiguous subcarrier spacings in the frequency domain, and each of the portions 800-1 and 800-2 extends across 10 SGs with corresponding time durations (24 ms) in the time domain and across 12 SGs, i.e., 12 subcarrier spacings, (60 kHz) in the frequency domain, respectively. In the time domain, each SG is associated with a respective SG index (e.g., SG index 1, 2, 3, 4, 5, 6, 7, 8, 9, or 10); and in the frequency domain, each SG is associated with a respective subcarrier index (e.g., subcarrier index 0, 1, 2, 3, 4, 5, 6, 7, 8, 9, 10, 11, 24, 25, 26, 27, 28, 29, 30, 31, 32, 33, 34, or 35). Because of the 12 contiguous subcarrier spacings between the portions 800-1 and 800-2, it is noted that subcarrier indexes between 11 and 24 are not contiguous.

According to some embodiments, the SG map 800 are divided into four sub-groups 801, 803, 805, and 807, which are filled with a dotted pattern, a diagonal stripes pattern, a vertical stripes pattern, and a horizontal stripes pattern, respectively, as shown in FIG. 8A. In some embodiments, in the SG map 800, the SGs sharing a common SG index (i.e., along a same column of the SG map 800) has a first quarter that belongs to the sub-group 801, a second quarter that belongs to the sub-group 803, a third quarter that belongs to the sub-group 805, and a fourth quarter that belongs to the sub-group 807. Further, along one of the columns of the SG map 800, each of the SGs, belonging to the sub-group 801, is associated with a respective PRACH (Physical Random Access Channel) index that is selected from one of 0, 1, 2, 3, 4, and 5; each of the SGs, belonging to the sub-group 703, is associated with a respective PRACH index that is selected from one of 0, 1, 2, 3, 4, and 5; each of the SGs, belonging to the sub-group 805, is associated with a respective PRACH index that is selected from one of 0, 1, 2, 3, 4, and 5; and each of the SGs, belonging to the sub-group 807, is associated with a respective PRACH index that is selected from one of 0, 1, 2, 3, 4, and 5. In some embodiments, respective distributions of the PRACH indexes in terms of SG index/ subcarrier index within each sub-group are pre-defined, as provided below.

For example, along the column with the SG index 1, the SGs within the sub-group 801 with the subcarrier indexes 0, 1, 2, 3, 4, and 5 are associated with respective PRACH indexes 0, 1, 2, 3, 4, and 5, respectively; the SGs within the sub-group 803 with the subcarrier indexes 6, 7, 8, 9, 10, and 11 are associated with respective PRACH indexes 0, 1, 2, 3, 4, and 5, respectively; the SGs within the sub-group 805 with the subcarrier indexes 24, 25, 26, 27, 28, and 29 are associated with respective PRACH indexes 0, 1, 2, 3, 4, and 5, respectively; the SGs within the sub-group 807 with the subcarrier indexes 30, 31, 32, 33, 34, and 35 are associated with respective PRACH indexes 0, 1, 2, 3, 4, and 5, respectively. Similarly, along each of other columns of the SG map 800, the SGs belonging to each sub-group are each associated with a corresponding PRACH index in terms of the sub-carrier index, as illustrated in FIG. 8A. Thus, for purposes of brevity, discussions of the PRACH indexes for the SGs along columns with SG indexes 2-10 are not repeated here.

The above-discussed distribution of PRACH indexes of the SG map 800 is pre-defined in accordance with a fifth frequency/time hopping rule that can be used by a UE (e.g., 104 of FIG. 1) to send a Preamble to a BS (e.g., 102 of FIG. 1) for initiating a random access procedure. In accordance with some embodiments of the present disclosure, the fifth frequency/time hopping rule indicates that the Preamble is sent using at least 10 SGs (i.e., the Preamble includes at least 10 SGs), each of which is selected from a respective SG index. Further, the fifth frequency/time hopping rule indicates that one of the sub-groups 801, 803, 805, and 807 is selected, and subsequently, a first SG can be randomly chosen from the first column (i.e., the column with the SG index 1) of the SG map 800 within the selected sub-group. Next, subsequent (e.g., remaining) SGs of the at least 10 SGs are each chosen from a respective column (i.e., the columns with SG indexes 2, 3, 4, 5, 6, 7, 8, 9, and 10) within the selected sub-group, wherein all 10 SGs share a same PRACH index. In an alternative embodiment, the fifth frequency/time hopping rule includes: randomly selecting an SG from the first column as the first SG of the at least 10 SGs; based on a respective sub-carrier index of the randomly selected SG in the first column, determining which of the sub-groups and which PRACH index to be used for the remaining 9 SGs of the at least 10 SGs. As such, the Preamble follows a corresponding Preamble format when the fifth frequency/time hopping rule is applied.

In an embodiment, when the fifth frequency/time hopping rule is applied and the Preamble is sent using more than 10 SGs, e.g., 20 SGs, respective subcarrier indexes of a first SG of a first set of 10 SGs and a first SG of a second set of 10 SGs may be randomly selected.

FIG. 8B provides an exemplary Preamble format 820 that can be used by a Preamble including at least 10 SGs when the fifth frequency/time hopping rule is applied. As mentioned above, one of the sub-groups 801, 803, 805, and 807 is selected. In FIG. 8B, the sub-group 801 is selected, for example. Next, a first SG within the sub-group 801 with a subcarrier index, e.g., subcarrier index "k," is chosen, wherein k is randomly chosen, and the remaining SGs (second, third, fourth, fifth, sixth, seventh, ninth, and tenth SGs) are chosen as follows. The second SG is chosen to hop "upwardly" from the first SG by 1 subcarrier index, e.g., from "k" to "k+1;" the third SG is chosen to hop "upwardly" from the second SG by 6 subcarrier indexes, e.g., from "k+1" to "k+7;" the fourth SG is chosen to hop "downwardly" from the third SG by 1 subcarrier index, e.g., from "k+7" to "k+6;" the fifth SG is chosen to hop "upwardly" from the fourth SG by 24 subcarrier indexes, e.g., from "k+6" to "k+30;" the sixth SG is chosen to hop "upwardly" from the fifth SG by 1 subcarrier index, e.g., from "k+30" to "k+31;" the seventh SG is chosen to hop "downwardly" from the sixth SG by 6 subcarrier indexes, e.g., from "k+31" to "k+25;" the eighth SG is chosen to hop "downwardly" from the seventh SG by 1 subcarrier index, e.g., from "k+25" to "k+24;" the ninth SG is chosen to hop "downwardly" from the eighth SG by 24 subcarrier indexes, e.g., from "k+24" to "k;" and the tenth SG is chosen to hop "upwardly" from the ninth SG by 1 subcarrier index, e.g., from "k" to "k+1."

It is noted that, in such an embodiment, at least three upward frequency hoppings and at least two downward frequency hoppings that each crosses over 1 subcarrier index, at least two upward frequency hoppings that each crosses over 6 and 24 subcarrier indexes, respectively, and at least two downward frequency hoppings that each crosses over 6 and 24 subcarrier indexes, respectively, are present in the Preamble format 820. Accordingly, the Preamble, using the Preamble format 820, can follow a hopping pattern that includes a first hopping path associated with a first plurality of increasing subcarrier indexes (e.g., from k+1 to k+7), a second hopping path associated with a second plurality of increasing subcarrier indexes (e.g., from k+6 to k+30), a third hopping path associated with a third plurality of decreasing subcarrier indexes (e.g., from k+31 to k+25), a fourth hopping path associated with a fourth plurality of decreasing subcarrier indexes (e.g., from k+24 to k), a fifth hopping path associated with 1 increasing subcarrier spacing (e.g., from k to k+1 in the format 820), a sixth hopping path associated with 1 decreasing subcarrier spacing (e.g., from k+7 to k+6 in the format 820), a seventh hopping path associated with 1 increasing subcarrier spacing (e.g., from k+30 to k+31 in the format 820), an eighth hopping path associated with 1 decreasing subcarrier spacing (e.g., from k+25 to k+24 in the format 820), and a ninth hopping path associated with 1 increasing subcarrier spacing (e.g., from k to k+1 in the format 820).

Further, in some embodiments, respective frequency intervals (or typically known as frequency hopping distances) of the first and third hopping paths may be equal to each other, and respective frequency intervals of the second and fourth hopping paths may be equal to each other. In some alternative embodiments, such frequency intervals of the first, second, third, and fourth hopping paths may be each of an integral times or a fractional times a respective subcarrier spacing (e.g., 1.25 kHz). Alternatively stated, the first plurality of increasing subcarrier spacings, the second plurality of increasing subcarrier spacings, the third plurality of decreasing subcarrier spacings, and the fourth plurality of decreasing subcarrier spacings may be each an integral times or a fractional times the 1.25 kHz subcarrier spacing in the current example.

Although, in the above discussions, the Preamble format (e.g., 420, 440, 520, 540, 620, 720, and 820) is directed to being used for transmitting a PRACH (Physical Random Access Channel) signal, it is noted that each of the above-discussed Preamble format can be used for transmitting an uplink signal (i.e., a signal transmitted from the UE 104 to the BS 102) while remaining within the scope of the present disclosure. For example, each of the above-discussed Preamble format can be used for transmitting a Positioning Reference signal, a Scheduling Request Reference signal, or the like.

Figure 9:
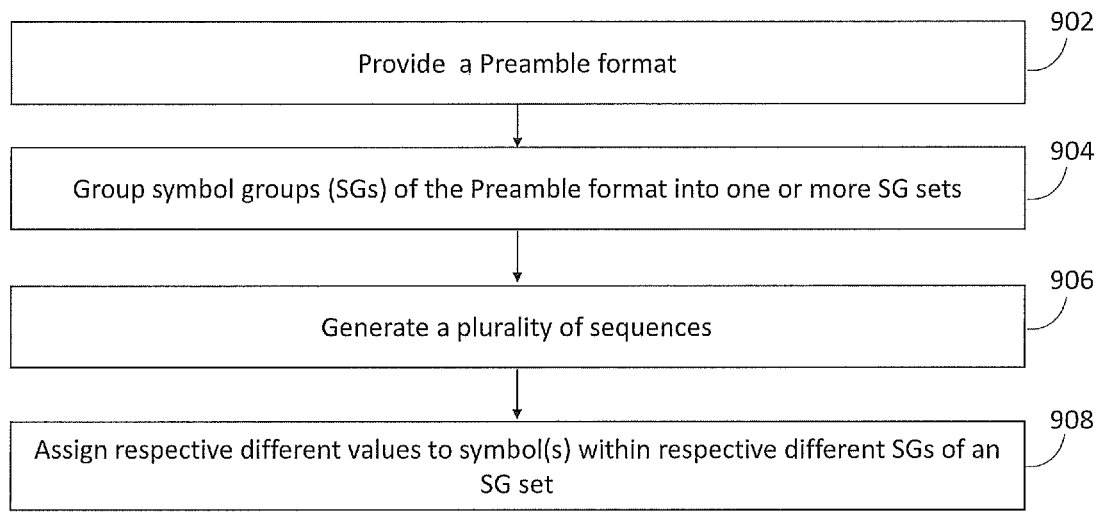
FIG. 9 illustrates a flow chart of an exemplary method to assign a value to symbols of a symbol group, in accordance with some embodiments of the present disclosure.

As mentioned above, each Preamble format includes a plurality of SGs (symbol groups), and each SG includes a plurality of CP and symbols. In some alternative embodiments, in order to further mitigate interference between neighboring cells (e.g., neighboring cells), the present disclosure provides various embodiments of a method 900 in FIG. 9 to allow each symbol to carry a number/value of a respective sequence, wherein such a sequence may be one of a plurality of pre-defined and/or pre-generated random sequences. Moreover, a length of such a sequence may be determined based on a length of a respective "symbol group set," which will be discussed in further detail below.

In accordance with some embodiments of the present disclosure, the method 900 starts with operation 902 in which a Preamble format is provided. Next, the method 900 proceeds to operation 904 in which respective SGs of the Preamble format is grouped into one or more SG sets. The method 900 proceeds to operation 906 in which a plurality of sequences are generated. In some embodiments, each of the plurality of sequences has a sequence length that may be determined based on a number of SGs included in the SG set provided in the operation 904. The method 900 proceeds to operation 906 in which one of the plurality of sequences is selected to be used for one of the one or more SG sets. The method 900 proceeds to operation 908 in which symbol(s) within respective different SGs of the SG set are each assigned with a respective different value contained in the selected sequence. Various examples are provided below to illustrate how each symbol is assigned with a respective value when the method 900 is used.

In an example, the Preamble format 420 of FIG. 4B that includes at least 8 SGs is provided. Next, the at least 8 SGs are grouped into 4 SG sets. In an embodiment, two adjacent SGs are grouped into a respective SG set. For example, the first and second SGs are grouped into a first SG set ($1^{st}$ SG set); the third and fourth SGs are grouped into a second SG set ($2^{nd}$ SG set); the fifth and sixth SGs are grouped into a third SG set ($3^{rd}$ SG set); and the seventh and eighth SGs are grouped into a fourth SG set ($4^{th}$ SG set). Next, a plurality of sequences are generated, wherein each sequence has a sequence length that is consistent with a number of the SGs in each SG set, which is 2 in the above example. For example, the plurality of sequences may include: {1, 1}, {1, −1}, {1, j}, and {1, −j}, wherein each of the sequence has a sequence length of 2, and accordingly is composed of two respective sequence values. Next, one of the plurality of sequences is selected to be used by one of the SG sets. For example, the sequence {1, −1} is selected to be used by the first SG set. As such, the symbols of the first SG of the first SG set are each assigned with one of the sequence values, e.g., "1," and the symbols of the second SG of the first SG set are each assigned with the other of the sequence values, e.g., "−1." Analogously, each of the remaining SG sets uses any of the four sequences, which can be identical to or different from the sequence used by the first SG set. For example, {1, −1}, which is identical to the one used by the first SG set, or one of {1, 1}, {1, j}, and {1, −j}, which is different from the one used by the second SG set, may be used by the second, third, or fourth SG set.

In another example, the Preamble format 620 of FIG. 6B that includes at least 7 SGs is provided. Next, the at least 7 SGs are grouped into 7 SG sets, each of which has one SG. Next, a plurality of sequences are generated, wherein each sequence a sequence length that is consistent with a number of the SGs in each SG set, which is 1 in the above example. For example, the plurality of sequences may include: {1}, {−1}, {j}, and {−j}, wherein each of the sequence has a sequence length of 1, and accordingly is composed of one respective sequence value. Next, one of the plurality of sequences is selected to be used by one of the SG sets. For example, the sequence {1} is selected to be used by a first SG set (i.e., a first SG in this example). As such, the symbols of the first SG set are each assigned with the sequence value "1." Analogously, each of the remaining SG sets uses any of the four sequences, which can be identical to or different from the sequence used by the first SG set.

In yet another example, the Preamble format 620 of FIG. 6B that includes at least 7 SGs is provided. Next, the at least 7 SGs are grouped into 1 SG set. Next, a plurality of sequences are generated, wherein each sequence a sequence length that is consistent with a number of the SGs in each SG set, which is 7 in the above example. The present disclosure provides embodiments of a method to generate a plurality of sequences, each of which has a sequence length of 7. In particular, the plurality of sequences may be generated by the following equation W, $$W = e^{j\Delta an}, \text{ wherein}$$

$$\Delta = \frac{2\pi}{N_{SG}}, N_{SG} = 7, \alpha \in [0, N_{SG} - 1], \text{ and } n \in [0, N_{SG} - 1].$$

In the above equation, "n" represents an $(n+1)^{th}$ sequence value within a sequence, and "α" represents an $\alpha^{th}$ sequence of the plurality of sequences. The present disclosure provides embodiments of another method to generate a plurality of sequences, each of which has a sequence length of 8. In particular, the plurality of sequences may be generated by the following equation W, $$W = e^{j\Delta an}, \text{ wherein}$$

$$\Delta = \frac{2\pi}{N_{SG}}, N_{SG} = 8, \alpha \in [0, N_{SG} - 1], \text{ and } n \in [0, N_{SG} - 1].$$

In the above equation, "n" represents an $(n+1)^{th}$ sequence value within a sequence, and "a" represents an $\alpha^{th}$ sequence of the plurality of sequences. As such, for each sequence with the sequence length of 8, 7 sequence values out of the 8 sequence values are selected to be respectively used by the 7 SG sets. In some embodiments, these 7 sequence values may be the first 7 sequence values of the 8 sequence values, the last 7 sequence values of the 8 sequence values, or randomly selected from the 8 sequence values.

In yet another example, the Preamble format 420 of FIG. 4B that includes at least 8 SGs is provided. The present disclosure provides embodiments of a method to generate a plurality of sequences, each of which has a sequence length of 4. In particular, the plurality of sequences may be generated by the following equation W, $$W = e^{j\Delta an}, \text{ wherein}$$

$$\Delta = \frac{2\pi}{N_{SG}}, N_{SG} = 4, \alpha \in [0, N_{SG} - 1], \text{ and } n \in [0, N_{SG} - 1].$$

In the above equation, "n" represents an $(n+1)^{th}$ sequence value within a sequence, and "a" represents an $\alpha^{th}$ sequence of the plurality of sequences. For example, using the above equation, a plurality of sequences with the sequence length of 4 include: {1, 1, 1, 1}, {1, j, −1, −j}, {1, −1, 1,−1}, and {1, −j, −1, j}. Similar to the method described above, the at least 8 SGs are grouped into a plurality of SG sets, each of which has 4 adjacent SGs. And each SG set, containing 4 SGs, uses one of the plurality of sequences with 4 respective different sequence values (because the sequence length is 4), to assign the 4 SGs' respective symbols with the 4 respective different sequence values.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    receiving a resource allocation message indicative of a set of wireless resources allocated for a signal; and
    transmitting the signal using a frequency hopping pattern specified in at least a portion of the set of wireless resources, wherein the portion comprises one or more time-indexed lists of subcarrier indices,
    wherein the frequency hopping pattern specifies a subcarrier index in time from the one or more time-indexed lists of subcarrier indices and comprises a first up-hopping path having upward frequency hoppings immediately followed by or immediately preceding a first down-hopping path having downward frequency hoppings,
    wherein the first up-hopping path and the first down-hopping path share at least one common subcarrier index, and
    wherein a first sum of pairwise distances between subcarrier indices in the first up-hopping path is equal to a second sum of pairwise distances between subcarrier indices in the first down-hopping path.

2. The method of claim 1, wherein the signal comprises a Physical Random Access Channel signal.

3. The method of claim 1, wherein:
the first up-hopping path corresponds to a first portion of the set of wireless resources;
the first down-hopping path corresponds to a second portion of the set of wireless resources; and
the second portion is different from the first portion.

4. The method of claim 1, wherein the portion of the set of wireless resources comprises one or more symbols.

5. The method of claim 1, wherein the frequency hopping pattern further comprises:
a second up-hopping path having a plurality of time-indexed subcarrier indices immediately followed by or immediately preceding a second down-hopping path, wherein the second up-hopping path and the second down-hopping path share a second common subcarrier index.

6. The method of claim 5, wherein a third sum of pairwise distances between subcarrier indices in the second up-hopping path and a fourth sum of pairwise distances between subcarrier indices in the second down-hopping path are equal to each other, but different from the first sum and the second sum.

7. A method, comprising:
transmitting a resource allocation message indicating a set of wireless resources allocated for a signal;
receiving the signal using a frequency hopping pattern specified in at least a portion of the set of wireless resources, wherein the portion comprises one or more time-indexed lists of subcarrier indices,
wherein the frequency hopping pattern between resource groups specifies a subcarrier index in time from the one or more time indexed lists of subcarrier indices,
wherein the frequency hopping pattern comprises a first up-hopping path having upward frequency hoppings immediately followed by or immediately preceding a first down-hopping path having downward frequency hoppings,
wherein the first up-hopping path and the first down-hopping path share a first common subcarrier index one resource group, and
wherein a first sum of pairwise distances between subcarrier indices in the first up-hopping path is equal to a second sum of pairwise distances between subcarrier indices in the first down-hopping path.

8. The method of claim 7, wherein the signal comprises a Physical Random Access Channel signal.

9. The method of claim 7, wherein:
the first up-hopping path corresponds to a first portion of the set of wireless resources;
the first down-hopping path corresponds to a second portion of the set of wireless resources; and
the second portion is different from the first portion.

10. The method of claim 7, wherein the portion of the set of wireless resources comprises one or more symbols.

11. The method of claim 7, wherein the frequency hopping pattern further comprises:
a second up-hopping path having a plurality of time-indexed subcarrier indices immediately followed by or immediately preceding a second down-hopping path, wherein the second up-hopping path and the second down-hopping path share a second common subcarrier index.

12. The method of claim 11, wherein a third sum of pairwise distances between subcarrier indices in the second up-hopping path and a fourth sum of pairwise distances between subcarrier indices in the second down-hopping path are equal to each other, but different from the first sum and the second sum.

13. A communication node, comprising:
a receiver configured to receive a resource allocation message indicative of a set of wireless resources allocated for a signal; and
a transmitter configured to transmit the signal using a frequency hopping pattern specified in a portion of the set of wireless resources, wherein the portion comprises one or more time-indexed lists of subcarrier indices,
wherein the frequency hopping pattern specifies a subcarrier index in time from the one or more time indexed lists of subcarrier indices and comprises a first up-hopping path having upward frequency hoppings immediately followed by or immediately preceding a first down-hopping path having downward frequency hoppings,
wherein the first up-hopping path and the first down-hopping path share a first common subcarrier index, and
wherein a first sum of pairwise distances between subcarrier indices in the first up-hopping path is equal to a second sum of pairwise distances between subcarrier indices in the first down-hopping path.

14. A communication node, comprising:
a transmitter configured to transmit a resource allocation message indicating a set of wireless resources allocated for a signal;
receive the signal using a frequency hopping pattern specified in at least a portion of the set of wireless resources, wherein the portion comprises one or more time-indexed lists of subcarrier indices,
wherein the frequency hopping pattern specifies a subcarrier index in time from the one or more time indexed lists of subcarrier indices,
wherein the frequency hopping pattern comprises a first up-hopping path having frequency hoppings immediately followed by or immediately preceding a first down-hopping path having downward frequency hoppings,
wherein the first up-hopping path and the first down-hopping path share a first common subcarrier index, and
wherein a first sum of pairwise distances between subcarrier indices in the first up-hopping path is equal to a second sum of pairwise distances between subcarrier indices in the first down-hopping path.

15. The communication node of claim 14, wherein the frequency hopping pattern further comprises:
a second up-hopping path having a plurality of time-indexed subcarrier indices immediately followed by or immediately preceding a second down-hopping path,
wherein the second up-hopping path and the second down-hopping path share a second common subcarrier index, and
wherein a third sum of pairwise distances between subcarrier indices in the second up-hopping path and a fourth sum of pairwise distances between subcarrier indices in the second down-hopping path are equal to each other, but different from the first sum and the second sum.

* * * * *